US009023499B2

(12) United States Patent
Takase et al.

(10) Patent No.: US 9,023,499 B2
(45) Date of Patent: May 5, 2015

(54) BATTERY MODULE

(75) Inventors: Shinichi Takase, Yokkaichi (JP); Ryoya Okamoto, Yokkaichi (JP); Tomoyuki Sakata, Yokkaichi (JP); Masakuni Kasugai, Osaka (JP); Hiroki Hirai, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 111 days.

(21) Appl. No.: 13/582,636

(22) PCT Filed: Mar. 8, 2011

(86) PCT No.: PCT/JP2011/055298
§ 371 (c)(1),
(2), (4) Date: Sep. 4, 2012

(87) PCT Pub. No.: WO2011/111678
PCT Pub. Date: Sep. 15, 2011

(65) Prior Publication Data
US 2012/0328920 A1    Dec. 27, 2012

(30) Foreign Application Priority Data

Mar. 12, 2010  (JP) ................................ 2010-056035
Feb. 24, 2011  (JP) ................................ 2011-038696

(51) Int. Cl.
*H01M 10/48*   (2006.01)
*H01M 2/10*    (2006.01)
*H01M 2/20*    (2006.01)

(52) U.S. Cl.
CPC ............ *H01M 2/1077* (2013.01); *H01M 2/202* (2013.01); *H01M 10/482* (2013.01)

(58) Field of Classification Search
CPC .. H01M 10/482; H01M 2/202; H01M 2/1077
See application file for complete search history.

(56) References Cited

U.S. PATENT DOCUMENTS 5,580,675 A * 12/1996 Rouhani ......................... 429/90
7,077,704 B2    7/2006 Ikeda et al.
(Continued)

FOREIGN PATENT DOCUMENTS

JP    A-2004-95357    3/2004
JP    B2-3990960      10/2007
(Continued)

OTHER PUBLICATIONS

Jun. 14, 2011 Written Opinion of the International Searching Authority issued in International Application No. PCT/JP2011/055298.
(Continued)

*Primary Examiner* — Carlos Barcena
*Assistant Examiner* — Lilia V Nedialkova
(74) *Attorney, Agent, or Firm* — Oliff PLC

(57) ABSTRACT

A battery module includes: a plurality of connecting members electrically connecting electric terminals of adjacent electric cells; and a flexible flat cable formed by flatly encapsulating an outer circumference of a flat conductor with an insulating resin and joining the plurality of connecting members. Portions of the flexible flat cable to be disposed between adjacent connecting members are provided with folded portions formed by folding the flexible flat cable at folded lines. The folded lines extend in a direction crossing a longitudinal direction of the flexible flat cable.

8 Claims, 21 Drawing Sheets

(56) References Cited

U.S. PATENT DOCUMENTS

| | | | |
|---|---|---|---|
| 7,604,507 B1* | 10/2009 | Millon | 439/627 |
| 7,611,384 B2* | 11/2009 | Maguire | 439/627 |
| 8,623,544 B2 | 1/2014 | Tsuchiya et al. | |
| 8,623,546 B2 | 1/2014 | Tsuchiya et al. | |
| 2004/0043663 A1 | 3/2004 | Ikeda et al. | |
| 2006/0270277 A1* | 11/2006 | Zhao et al. | 439/627 |
| 2007/0154793 A1* | 7/2007 | Bang et al. | 429/160 |
| 2010/0047686 A1* | 2/2010 | Tsuchiya et al. | 429/178 |
| 2010/0052692 A1 | 3/2010 | Yano et al. | |
| 2012/0019061 A1 | 1/2012 | Nishihara et al. | |
| 2012/0264001 A1 | 10/2012 | Tsuchiya et al. | |
| 2012/0264003 A1 | 10/2012 | Tsuchiya et al. | |
| 2012/0264004 A1 | 10/2012 | Tsuchiya et al. | |
| 2012/0264005 A1 | 10/2012 | Tsuchiya et al. | |
| 2012/0264006 A1 | 10/2012 | Tsuchiya et al. | |

FOREIGN PATENT DOCUMENTS

| | | |
|---|---|---|
| JP | A-2010-3466 | 1/2010 |
| JP | A-2010-114025 | 5/2010 |
| JP | A-2011-18473 | 1/2011 |
| JP | A-2011-18478 | 1/2011 |
| JP | A-2011-507008 | 3/2011 |
| JP | 2012-174457 A | 9/2012 |
| WO | WO 2008/084883 A2 | 7/2008 |
| WO | WO 2010/113455 A1 | 10/2010 |
| WO | 2012/053581 A1 | 4/2012 |

OTHER PUBLICATIONS

Jun. 14, 2011 International Search Report issued in International Application No. PCT/JP2011/055298 (with translation).

Aug. 7, 2014 Office Action issued in Japanese Patent Application No. 2011-038696 (with English Translation).

Oct. 21, 2014 Office Action issued in Japanese Patent Application No. 2011-038696 (with translation).

Feb. 9, 2015 Search Report issued in European Application No. 11753336.4.

* cited by examiner

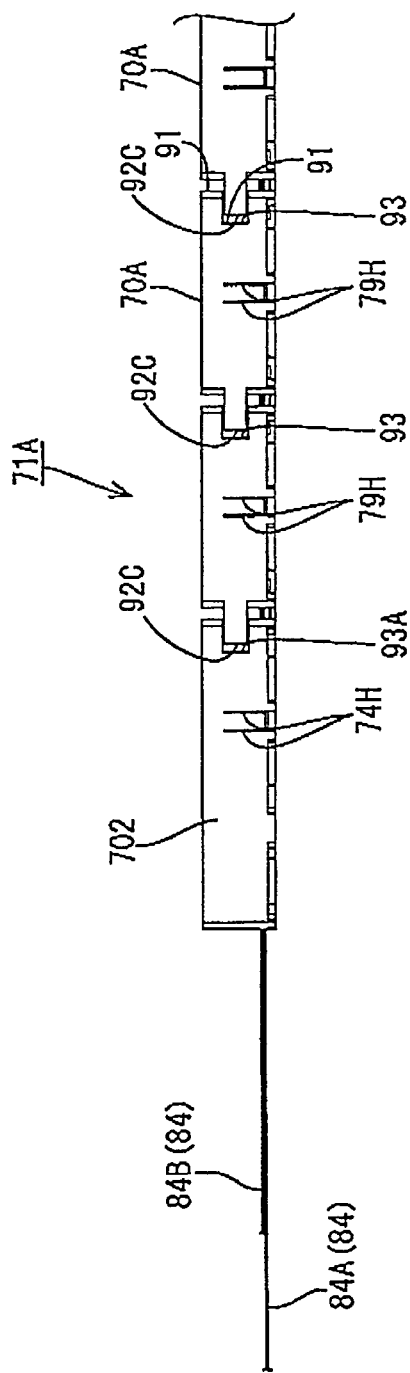

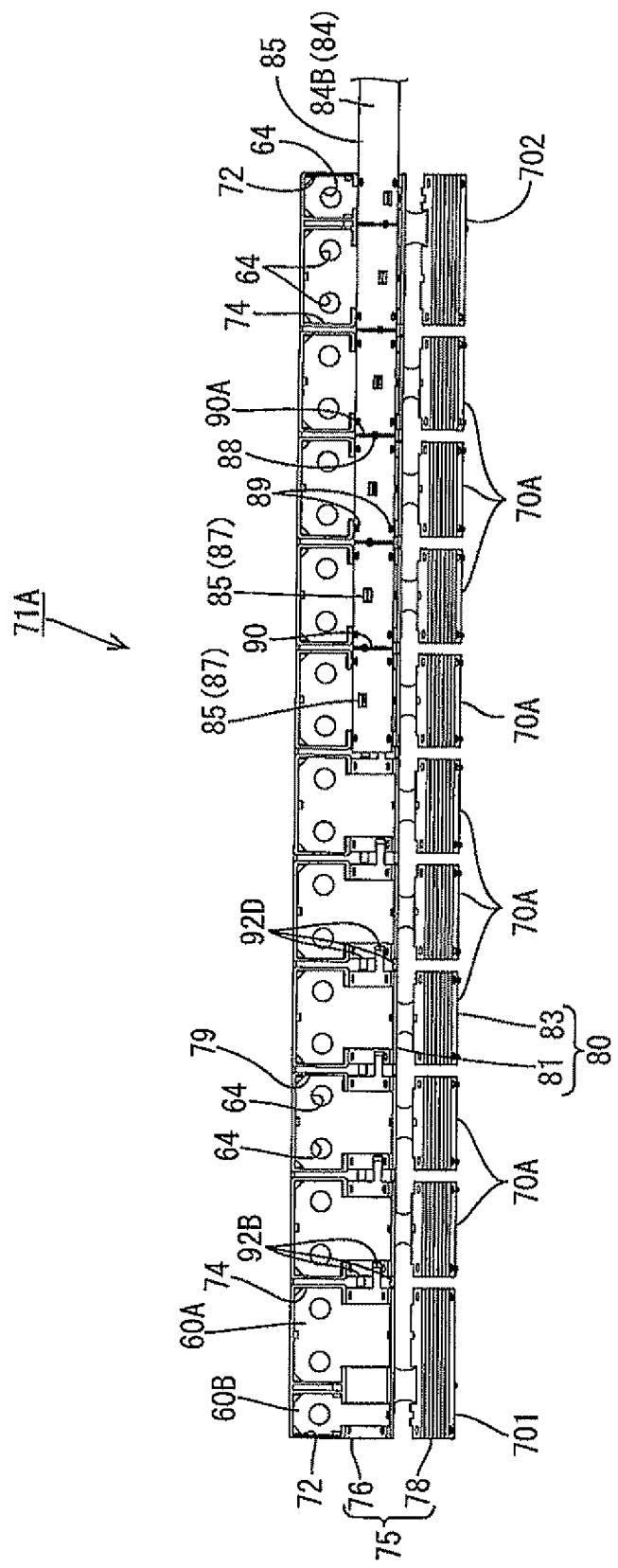

BATTERY MODULE

TECHNICAL FIELD

This invention relates to a battery module.

BACKGROUND ART

In battery modules for use in electric cars and hybrid cars, several electric cells are connected in transverse juxtaposition in order to increase the output. The plurality of electric cells is connected in series or in parallel by connecting electrode terminals of the electric cells adjacent to each other with members such as bus bars.

Assembly of the battery module having the above structure requires the connecting members to connect the electrode terminals at plural positions, which thus necessitates a cumbersome operation to repeat the operations for connecting the electrode terminals with the connecting members.

With the above background, one proposal is made that a use of a battery connecting plate in which, in accordance with the number of inter-terminal spaces between the electrode terminals to be connected, a plurality of connecting members disposed in a die is integrated into a resin by a method such as insert molding (e.g., see, Patent Document 1).

Patent Document 1: Japanese Patent No. 3990960

With use of the battery connecting plate disclosed in the above Patent Document 1, the plurality of inter-terminal spaces between the electrode terminals of the electric cells adjacent to each other is collectively connectable simply by attaching the single battery connecting plate to the plurality of electrode terminals protruding from the plurality of electric cells, which enhances the operational efficiency.

However, since assembly tolerance is set between the plurality of juxtaposed electric cells, pitches between the electrode terminals of the adjacent electric cells may not become constant in the battery module in which the plurality of electric cells is juxtaposed. When the above-described battery connecting plate is connected to the electrode terminals with the non-constant pitches, the electrode terminals and the connecting members of the battery connecting plate may be positionally misaligned, which can lead to reduction in the efficiency of the connecting operations of the battery connecting plate.

Further, when the non-constancy of the pitches between the electrode terminals is increased due to shrinkage or expansion of the electric cells of the battery module in the direction in which the electric cells are juxtaposed, the integrally-molded connecting plate described above may not be able to compensate the positional misalignment.

Therefore, there is a need in the art to provide a battery module in which non-constancy of pitches between adjacent electrode terminals is easily adjustable.

SUMMARY

To solve the above-described problems, a battery module according to the present invention, in which a plurality of electric cells each having positive and negative electrode terminals is transversely juxtaposed, includes: a plurality of connecting members electrically connecting the electrode terminals of electric cells adjacent to each other; and a flexible flat cable formed by flatly encapsulating an outer circumference of a flat conductor with an insulating resin and jointing the plurality of connecting members. In the battery module, portions of the flexible flat cable to be disposed between adjacent connecting members are provided with folded portions formed by folding the flexible flat cable at folded lines, the folded lines extending in a direction crossing a longitudinal direction of the flexible flat cable.

In the battery module according to the present invention, the plurality of connecting members electrically connecting the electrode terminals is joined to one another by the flexible flat cable. The portions of the flexible flat cable to be disposed between the adjacent connecting members are provided with the folded members formed by folding the flexible flat cable at the folded lines extending in the direction crossing the longitudinal direction of the flexible flat cable. Therefore, according to the present invention, even when pitches between the adjacent electrode terminals of the electric cells in the battery module are not constant, or when the pitches between the adjacent electrode terminals are made non-constant due to shrinkage or expansion of the electric cells of the battery module in the direction in which the electric cells are juxtaposed, the non-constancy is compensated by the folded portions of the flexible flat cable. As a result, in the battery module according to the present invention, non-constancy of the pitches between the adjacent electrode terminals is easily adjustable.

In the battery module according to the present invention, non-constancy of the pitches between the electrode terminals adjacent to each other is easily adjustable.

BRIEF DESCRIPTION OF THE DRAWINGS

FIG. 20 is a lateral view depicting the first container member line; and

FIG. 21 is a top view explaining a process of connecting the flexible flat cable to the first container member line.

Figure 1:
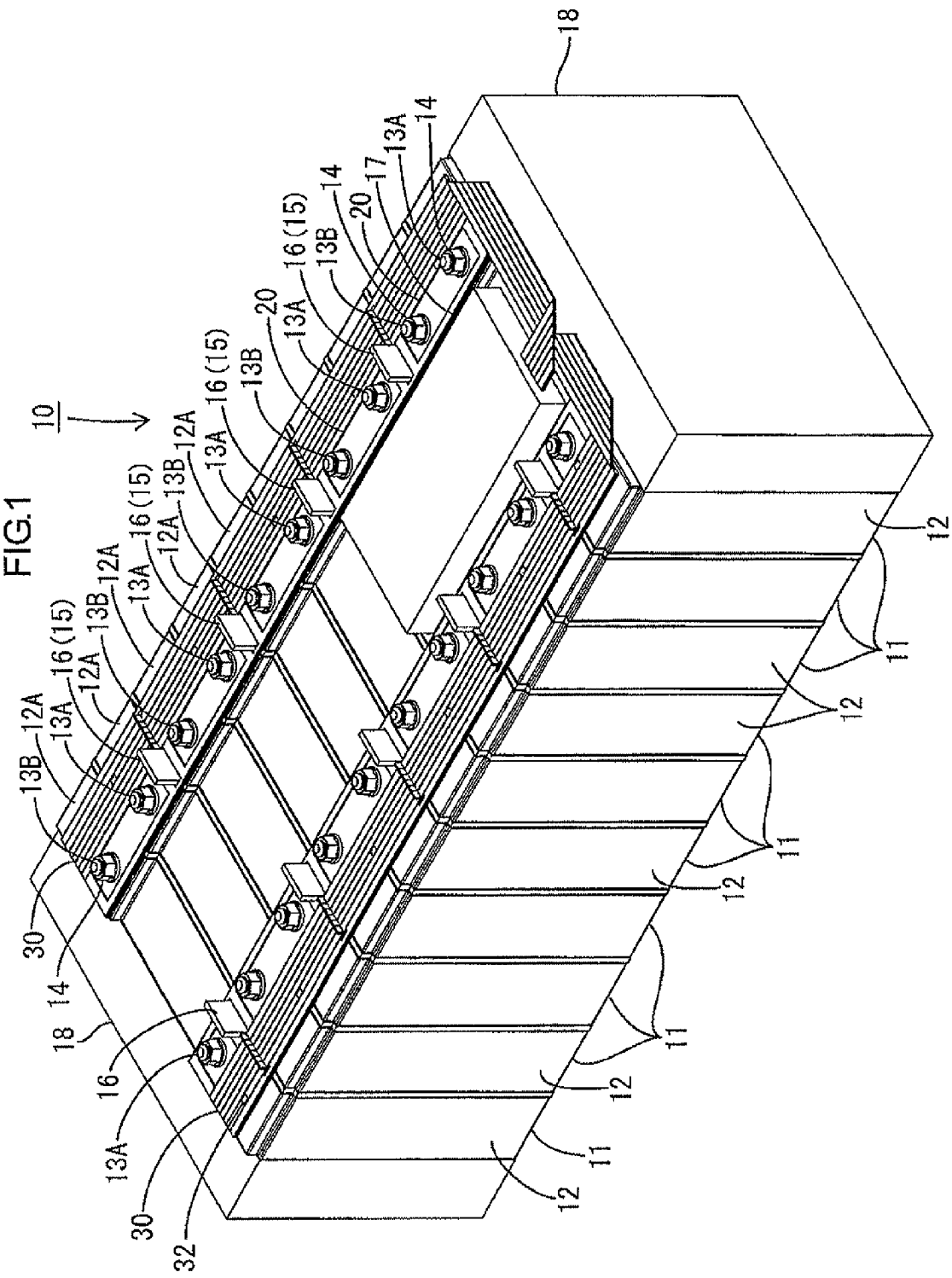
FIG. 1 is a perspective view depicting a battery module according to a first embodiment.

EXPLANATION OF SYMBOLS 10, 50: Battery module
11, 51: Electric cell
12, 52: Battery container
12A: Upper end surface (Outer wall surface)
13A, 53A: Electrode terminal (Positive electrode)
13B, 53B: Electrode terminal (Negative electrode)
15: Separator
16: Projection
20, 60: Bus bar
22A: Insulating resin portion
24, 64: Terminal insertion hole
30, 84: Voltage detecting line (Flexible flat cable)
31, 90: Mountain folded portion (Folded portion)
31A, 90A: Folding line
32, 87: Connecting portion
33, 86: Insulating resin (of FFC)
34, 85: Conductor
70: Container member
75, 80: FFC container (Holder)
76, 81: FFC mounting portion
78, 83: FFC holder
91: Joint
92: Jointing projection
93: Jointing receiver

BEST MODE FOR CARRYING OUT THE INVENTION

<First Embodiment>
A first embodiment according to the present invention will be described with reference to FIGS. 1 to 9.

A battery module 10 according to this embodiment is usable as, for instance, a driving source for electric cars, hybrid cars or the like. As depicted in FIG. 1, the battery module 10 includes: a plurality of electric cells 11 juxtaposed transversely; a plurality of bus bars 20 (connecting members 20) connecting the plurality of electric cells 11 in series; and a voltage detecting line 30 measuring the voltage of each electric cell 11. In the following description, the "upper" direction and the "lower" direction will respectively be aligned with those depicted in FIG. 3.

As depicted in FIG. 1, the electric cell 11 includes: a battery container 12 made of a metal to internally contain a power generating element (not depicted); and bolt-shaped electrode terminals 13A and 13B (a positive electrode is represented by the symbol 13A while a negative electrode is represented by the symbol 13B). The electrode terminals 13A and 13B project perpendicularly from an upper end surface 12A (terminal forming surface 12A) of the battery container 12. The electric cells 11 are juxtaposed such that positive sides and negative sides of electric cells 11 adjacent to each other are opposite to each other. Accordingly, the electrode terminals 13A and 13B, which respectively have different polarities, are adjacent to each other. The electrode terminals 13A and 13B are fastened with nuts 14 while interposed by the bus bars 20.

Figure 2:
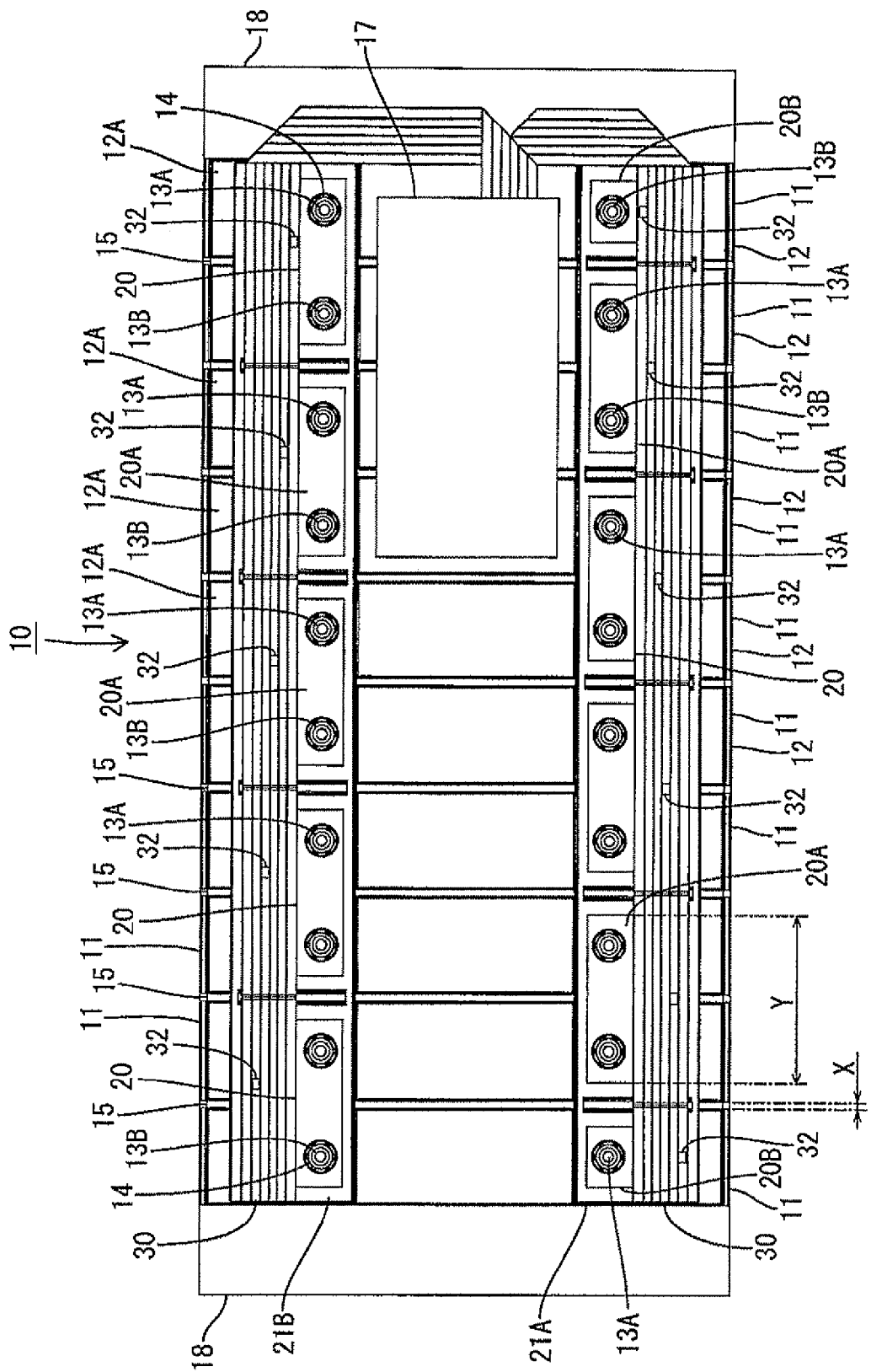
FIG. 2 is a top view depicting the battery module.
Figure 3:
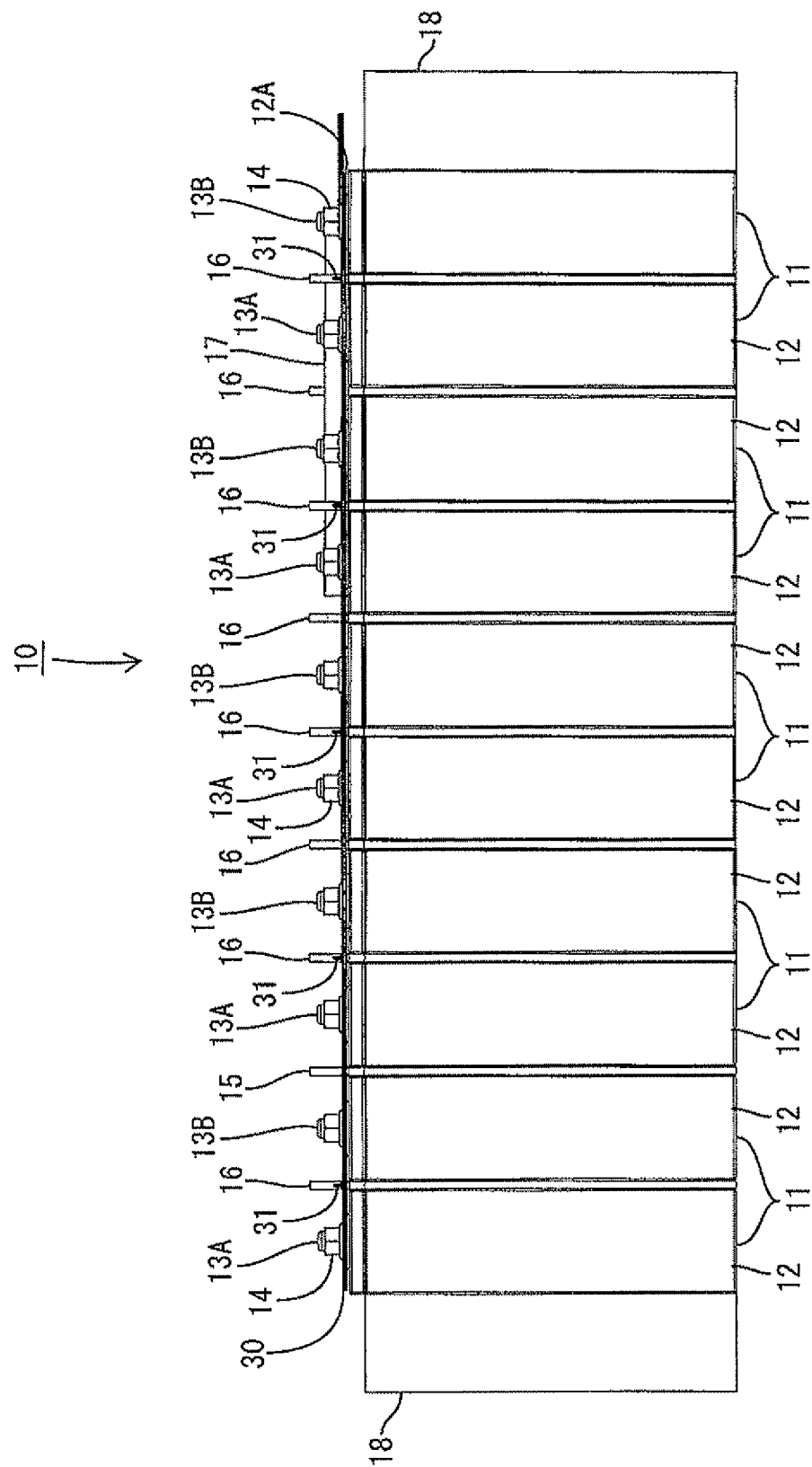
FIG. 3 is a lateral view depicting the battery module.
Figure 4:
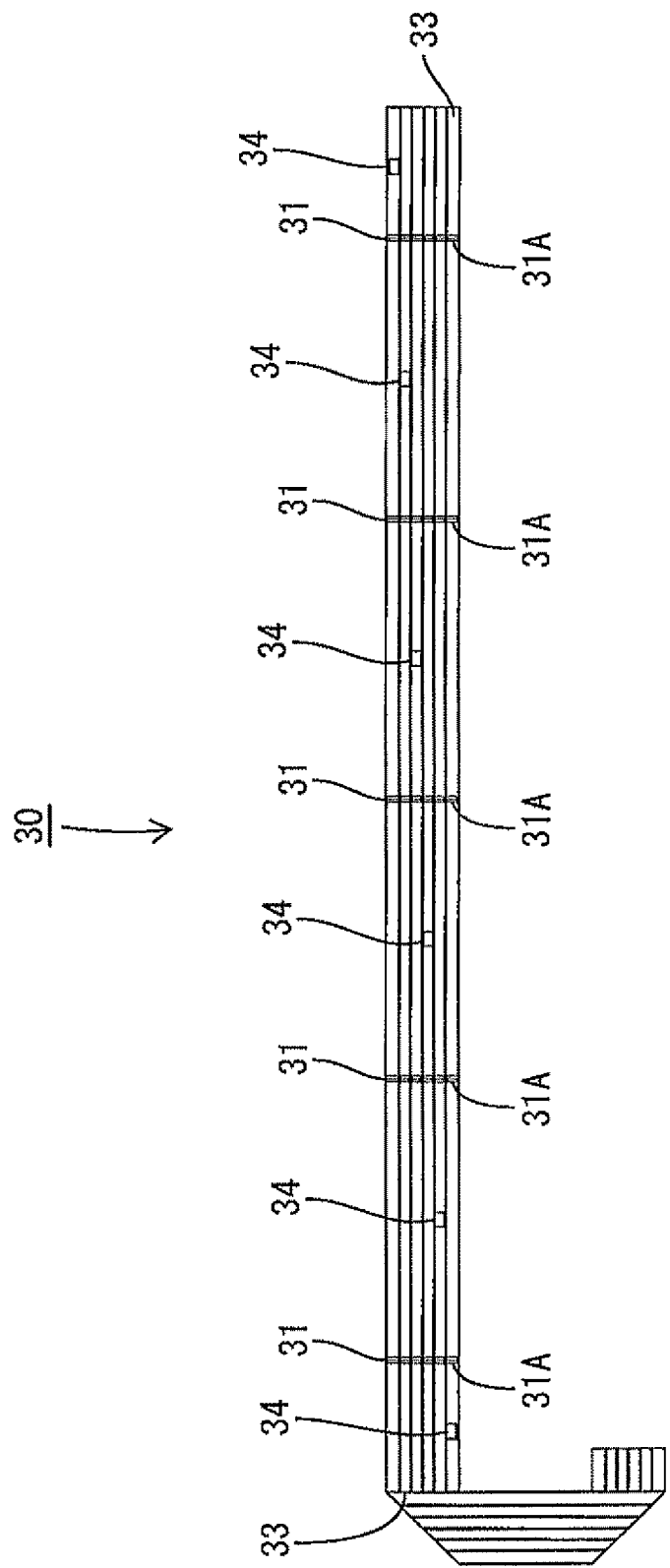
FIG. 4 is a top view depicting a flexible flat cable.

The plurality of electric cells 11 is fixed by two holding plates 18 and 18 disposed respectively at the right and left sides in FIG. 2. A separator 15 made of a resin is disposed between adjacent two electric cells 11 and 11. As depicted in FIG. 3, the separator 15 has a projection 16 projecting upward from the terminal forming surface 12A of the battery container 12 (i.e., in a direction outward from an outer wall surface 12A of the battery container 12). The projection 16 is located at a clearance 23 provided between adjacent two bus bars 20 and 20, to prevent the electrodes from being short circuited due to tools.

As depicted in FIG. 2, belt-shaped bus bar lines 21A and 21B formed by connecting the plurality of bus bars 20 are disposed on the plurality of electric cells 11 in a direction in which the electric cells 11 are juxtaposed. The bus bar lines 21A and 21B are disposed to form two lines in the direction in which the electric cells 11 are juxtaposed. The belt-shaped voltage detecting line 30, which extends in the direction in which the electric cells 11 are juxtaposed, is disposed on each of the bus bar lines 21A and 21B to partially cover the bus bar lines 21A and 21B (see, FIGS. 3, 7 and 8).

Figure 6:
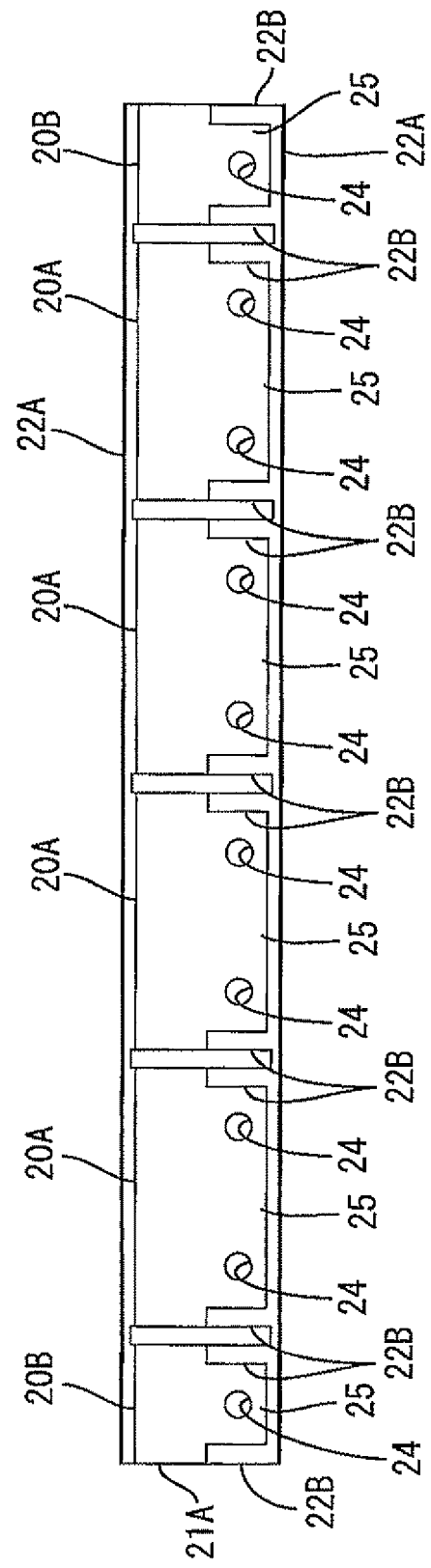
FIG. 6 is a top view depicting the connecting members after the connecting members are integrated by a film made of an insulating resin.

As depicted in FIGS. 3 and 6, the bus bar lines 21A and 21B are provided with insulating resin portions 22A formed by heat laminating a film made of an insulating resin such as polypropylene (PP), polyvinyl chloride (PVC), polybutylene terephthalate (PBT) or polyethylene terephthalate (PET), and the insulating resin portions 22A rim two longitudinal sides of the bus bar lines 21A and 21B. In other words, the bus bar lines 21A and 21B are integrally formed by connecting the plurality of bus bars 20 with use of the insulating resin portions 22A.

As depicted in FIG. 2, the plurality of bus bars 20 in the bus bar lines 21A and 21B is aligned such that adjacent bus bars 20 and 20 are spaced apart from each other by a predetermined interval X. The sum of the interval X and a longitudinal dimension Y of a two-hole bus bar 20A (detailed later) is set to be slightly greater than a width dimension of two electric cells 11 and 11 between which the separator 15 is interposed.

The bus bars 20 included in the bus bar lines 21A and 21B have terminal insertion holes 24 through which the electrode terminals 13A and 13B are inserted for connection, and the terminal insertion holes 24 are aligned in a line. Of the two bus bar lines 21A and 21B, the bus bar line 21A (i.e., the one located at the side closer to the reader in FIG. 2) has, at its both ends, single-hole bus bars 20B each provided with a single terminal insertion hole 24. Between the two single-hole bus bars 20B and 20B located at the respective ends of the bus bar line 21A, four two-hole bus bars 20A each provided with two terminal insertion holes 24 are disposed. Of the two bus bar lines 21A and 21B, the bus bar line 21B (i.e., the one located at the side away from the reader in FIG. 2) has five two-hole bus bars 20A. In this description, the "bus bar(s) 20" includes the two-hole bus bar(s) 20A and the single-hole bus bar(s) 20B.

Figure 5:
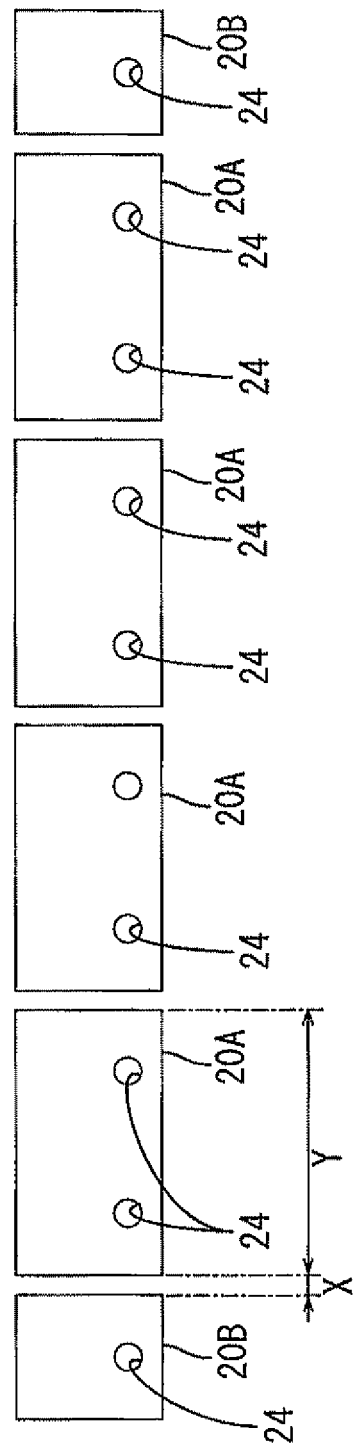
FIG. 5 is a top view depicting connecting members before the connecting members are integrated by a film made of an insulating resin.

As depicted in FIG. 5, the bus bars 20 each are substantially rectangular, and have the terminal insertion holes 24 and 24 through which the electrode terminals 13A and 13B are inserted for connection. The bus bars 20 are formed by punching a metal plate material such as copper, copper alloy, aluminum, aluminum alloy, gold or stainless steel (SUS). In order to enhance the weldability, the bus bars 20 maybe subjected to a plate processing with a metal such as Sn, Ni, Ag or Au.

Shorter sides of the bus bars 20 are partially provided with insulating resin portions 22B formed by heat laminating a film made of an insulating resin such as PP, PVC, PBT or PET. The shorter-side portions of the bus bars 20 at which the insulating resin portions 22B are provided correspond to ends of terminal connecting regions 25 for connection with the electrode terminals 13A and 13B. With the insulating resin portions 22B, the bus bars 20 are kept insulated from one another. The clearance 23, which is provided between the terminal connecting regions 25 of the adjacent bus bars 20 and 20, serves as a projection disposing clearance 23 at which the projection 16 of the separator 15 is disposed.

The bus bars 20 each connect (electrically) the adjacent electrode terminals 13A and 13B together. On the other hand, the bus bars 20 each are connected with the voltage detecting line 30 measuring the voltage of each electric cell 11.

In this embodiment, the voltage detecting line 30 connected to the bus bars 20 is a flexible flat cable (FFC 30) formed by flatly encapsulating an outer circumference of a flat conductor 34 with an insulating resin 33.

An example of FFC 30 is a flexible flat cable formed by laminating a plurality of aligned copper foils (conductors 34) with a resin such as polyethylene terephthalate. Preferably, the thickness of the FFC 30 is 0.6 mm or more and 0.7 mm or less.

As depicted in FIG. 1, the FFC 30 is disposed on each of the two bus bar lines 21A and 21B. The FFC 30 is bent to form a trapezoidal shape at the holding plate 18 at the right end, and connected to a battery ECU 17 disposed on the electric cells 11. The battery ECU 17, in which a micro computer, devices and the like are installed, has a known structure. The battery ECU 17 serves to detect the voltage, current, temperatures and the like of the electric cells 11 and control the charging and discharging of each electric cell 11.

The FFC 30 has mountain folded portions 31 (folded portions 31) respectively at the portions to be disposed between the adjacent bus bars 20 and 20. The mountain folded portions 31 are formed by folding the FFC 30 at folding lines 31A extending in a direction substantially perpendicular to the longitudinal direction of the FFC 30 (direction crossing the longitudinal direction of the FFC 30). Projecting dimensions Z of the mountain folded portions 31 are preferably 10 mm or less (see, FIG. 9).

The FFC 30 has connecting portions 32 at which the FFC 30 is connected to the bus bars 20. The connecting portions 32 connecting the FFC 30 with the bus bars 20 are formed by: peeling the insulating resin 33 of the FFC 30 by laser or the like to expose the conductors 34; and connecting the exposed conductors 34 with the bus bars 20 by a variety of welding methods (such as resistance welding, ultrasonic welding or soldering). Of the above welding methods, the resistance welding is preferably usable at low cost.

In the next description, a method of attaching the bus bars 20 and the voltage detecting line 30 will be described.

The insulating resin 33 of the FFC 30 is peeled by laser (not depicted) to expose the conductors 34 respectively corresponding to the bus bars 20. Then, the predetermined portions of the FFC 30 are bent at the folded lines 31A substantially perpendicular to the longitudinal direction of the FFC 30 to form the mountain folded portions 31, and the end of the FFC 30 to be connected to the ECU 17 is bent to form a trapezoidal shape (see, FIG. 4).

At the same time as the processing of the FFC 30, or before or after the processing of the FFC 30, the bus bar lines 21A and 21B are prepared in the following steps. First of all, the bus bars 20 are formed by punching a metal plate. In this embodiment, two single-hole bus bars 20B and nine two-hole bus bars 20A are prepared. These prepared bus bars 20 are subjected to plating as needed.

Subsequently, five two-hole bus bars 20A are aligned with predetermined intervals interposed between each other such that the terminal insertion holes 24 are aligned in a line. On the other hand, the two single-hole bus bars 20B and the four two-hole bus bars 20A, which are to be located between the two single hole bus bars 20B, are aligned with predetermined intervals interposed between each other such that the terminal insertion holes 24 are aligned in a line (see, FIG. 5).

Then, portions of the short sides of the bus bars 20 (the ends of the terminal connecting regions 25) are sandwiched between films made of an insulating resin, and subjected to heat laminating. Thereafter, the longitudinal sides of the bus bars 20 are sandwiched between films made of an insulating resin, and subjected to heat laminating. By performing the heat laminating on the films made of an insulating resin, the two longitudinal sides of the bus bars 20 and the portions of the short sides thereof are provided with the insulating resin portions 22A and 22B respectively (see, FIG. 6). The insulating resin portions 22A provided to the longitudinal sides of the bus bars 20 are continuously formed so as to connect the adjacent bus bars with each other, and thus the plurality of bus bars 20 is integrated by the insulating resins 22A. At the time of the heat laminating, adhesive may be used as needed.

Figure 7:
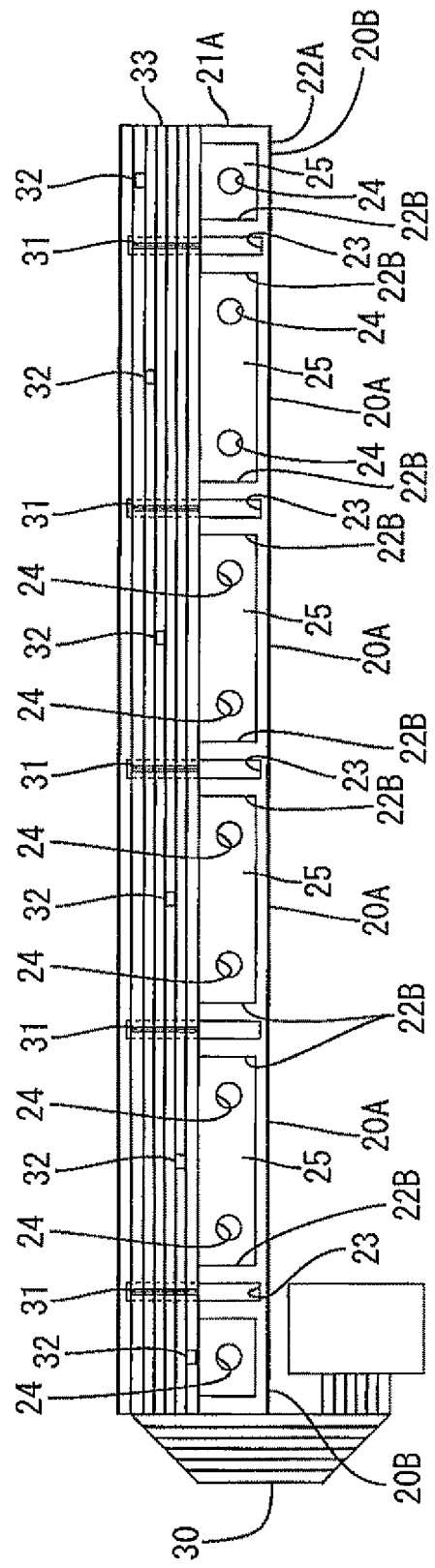
FIG. 7 is a top view depicting the connecting members connected with the flexible flat cable.
Figure 8:
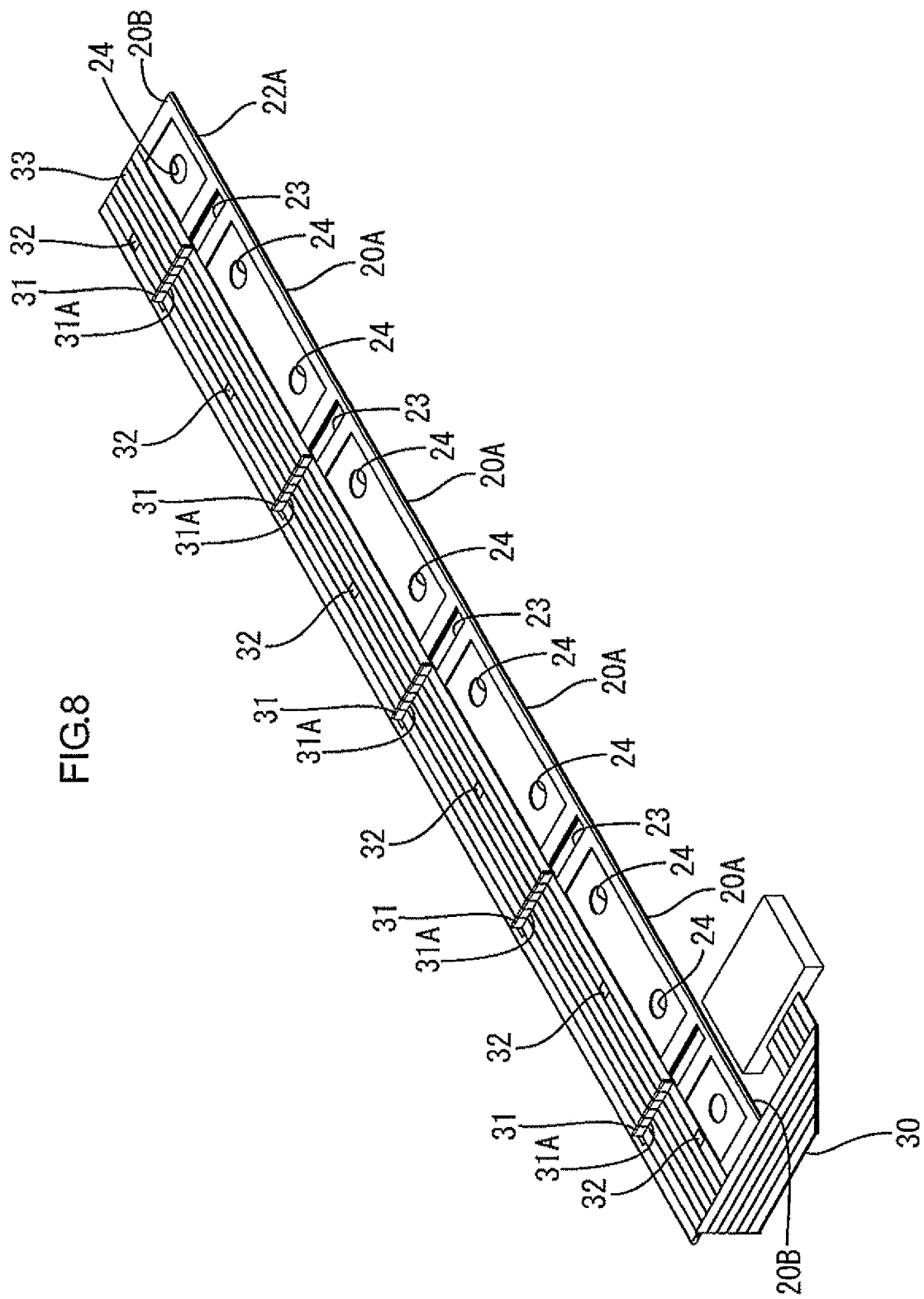
FIG. 8 is a perspective view depicting the connecting members connected with the flexible flat cable.
Figure 9:
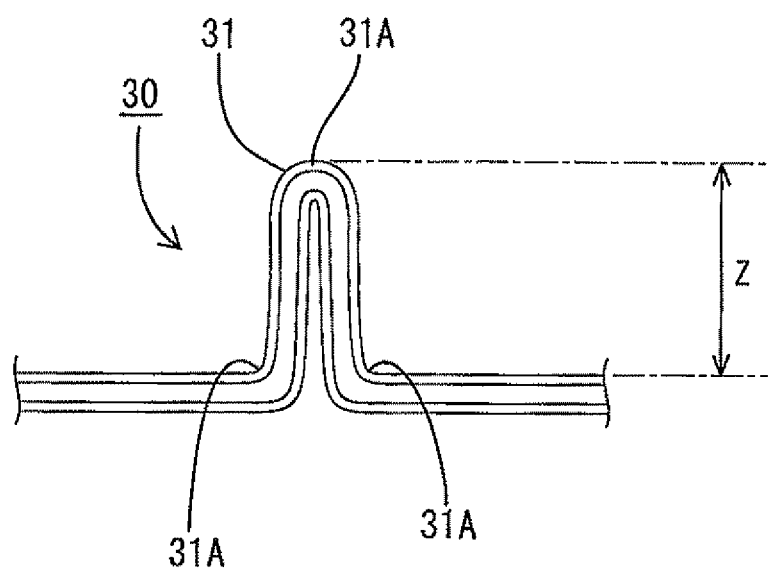
FIG. 9 is a partially enlarged view schematically depicting a folded portion of the flexible flat cable.

By mounting the FFC 30 onto the bus bar lines 21A and 21B prepared in the above steps, and connecting the exposed conductor 34 of the FFC 30 with the bus bars 20 by welding, the bus bar lines 21A and 21B connected with the FFC 30 are obtained (see, FIGS. 7 and 8).

Then, ten electric cells 11 are transversely juxtaposed such that the electrode terminals 13A and 13B of different polarities are opposite to each other at each adjacent pair of electric cells 11 and 11. The bus bar lines 21A and 21B connected with the FFC 30, which are prepared in the above-described process, are subsequently mounted onto an upper surface 12A (the terminal forming surface 12A) of the electric cells 11.

Thereafter, as depicted in FIG. 1, the electrode terminals 13A and 13B of the transversely-juxtaposed electric cells 11 are all inserted into all of the terminal insertion holes 24 of the bus bars 20. Further, as depicted in FIG. 1, the electrode terminals 13A and 13B protruding from the terminal insertion holes 24 are fastened by screwing the nuts 14. Then, after all of the electrode terminals 13A and 13B are fastened with the nuts 14, the battery module 10 mounted with the bus bars 20 and the voltage detecting line 30 is completed.

According to this embodiment, the following advantageous effects are obtained.

The battery module 10 according to this embodiment includes the FFC 30 as the component for jointing together the plurality of bus bars 20 electrically connecting the electrode terminals 13A and 13B, and the portions of the FFC 30 to be disposed between the adjacent bus bars 20 and 20 are provided with the folded portions 31 formed by folding the FFC 30 at the folding lines extending in the direction crossing the longitudinal direction of the FFC 30. Thus, according to this embodiment, even when pitches between the adjacent electrode terminals 13A and 13B of the electric cells 11 of the battery module 10 are not constant, or even when the pitches between the electrode terminals 13A and 13B are made non-constant due to the shrinkage or expansion of the electric cells 11 of the battery module 10 in the direction in which the electric cells 11 are juxtaposed, such non-constancy of the pitches between the electrode terminals 13A and 13B is compensated by the folded portions 31 provided to the FFC 30. Resultantly, in the battery module 10 according to this embodiment, non-constancy of the pitches between the adjacent electrode terminals 13A and 13B is easily adjustable.

Further, according to this embodiment, since the FFC 30 is a voltage detecting line measuring the voltage of the electric cells 11, the FFC 30 not only connects the bus bars 20 but also serves as the voltage detecting line detecting the voltage of the electric cells 11. Therefore, no other voltage detecting line than the FFC 30 is required to be separately connected to the battery module 10, and thus the number of components is reducible.

In addition, according to this embodiment, the flat-shaped FFC 30 is used as the voltage detecting line 30, and the conductors 34 of the FFC 30 are directly connected to the bus bars 20. Therefore, the connection structure of the voltage detecting line 30 saves space in the upper and lower direction of the electric cells 11 (the thickness direction of the terminal forming surface 12A) (see, FIG. 3), and the connection structure of the voltage detecting line is downsized in the battery module 10. Further, with the above structure, the FFC 30 is connectable to the bus bars 20 by a low-cost method such as resistance welding or ultrasonic welding, which also contributes to a cost reduction.

According to this embodiment, the plurality of bus bars 20 is integrated together by the insulating resin portions 22A formed by heat laminating the insulating resin films. Thus, this structure prevents detachment of the bus bars 20 and the voltage detecting line 30 due to the stress applied onto the connecting portions 32 between the bus bars 20 and the voltage detecting line 30.

Further, according to this embodiment, the electric cells 11 have the metal-made battery containers 12, and the resin-made separators 15 having the projections 16 projecting outward from the upper surface 12A of the battery containers 12 are disposed between the adjacent electric cells 11 and 11. Therefore, the short circuiting between the electrodes due to tools is prevented, and thus there is no need to separately provide any other short-circuiting prevention rib than the separators 15. As the consequence, the number of components is reducible also in the battery module 10 including the electric cells 11 provided with the metal-made battery containers 12.

<Second Embodiment>

A second embodiment according to the present invention will be described with reference to FIGS. 10 to 21.

Figure 10:
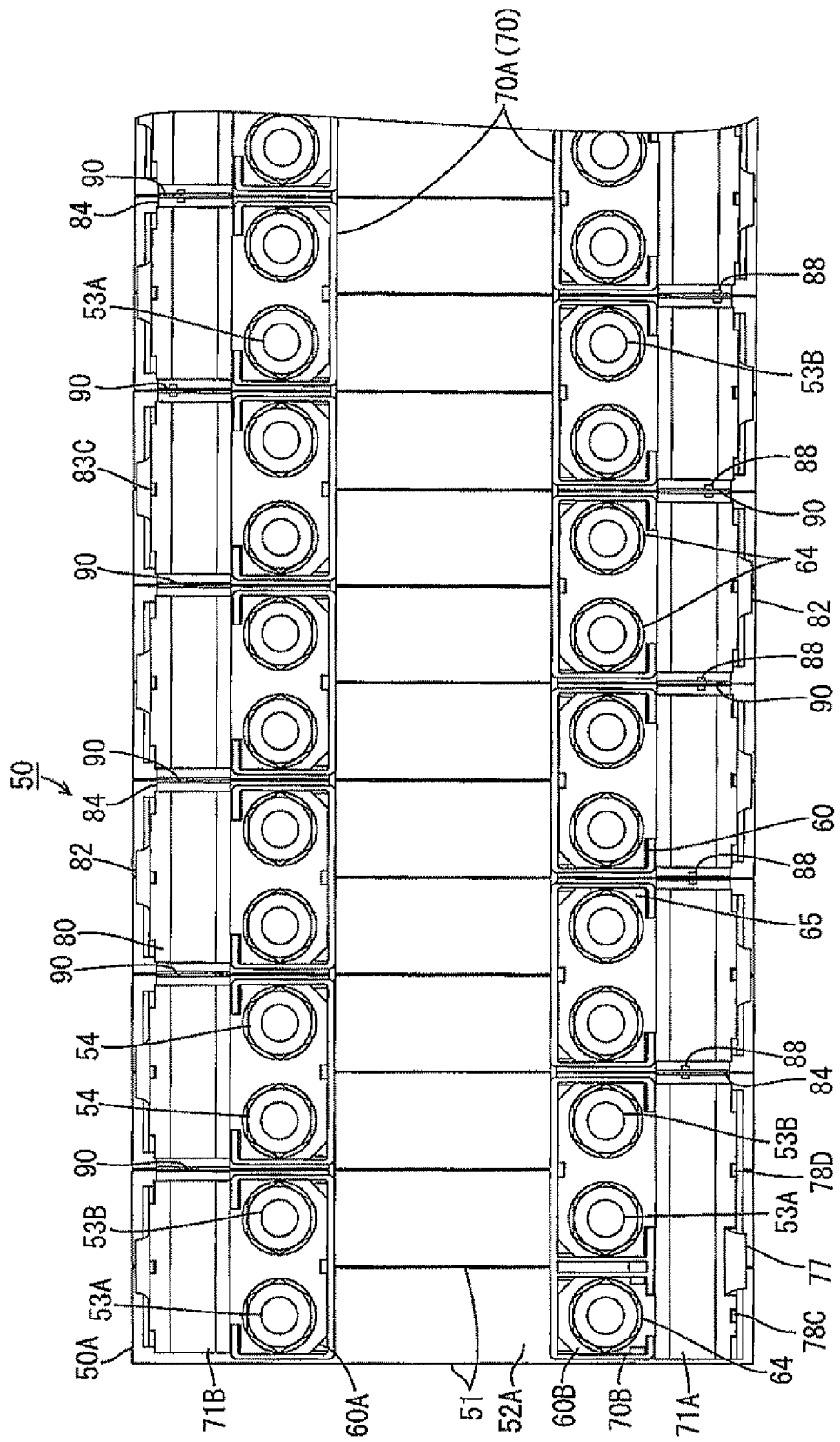
FIG. 10 is a top view partially depicting a battery module according to a second embodiment.

A battery module 50 according to this embodiment is usable as, for instance, a driving source for electric cars, hybrid cars or the like. As depicted in FIG. 10, the battery module 50 includes: a plurality of electric cells 51 juxtaposed transversely; a plurality of bus bars 60 (connecting members 60) connecting the plurality of electric cells 51 in series; and a plurality of container members 70 containing and holding an FFC 84 used as a voltage detecting line for measuring the voltage of each electric cell 51. In the following description, the "upper direction" and the "lower direction" will respectively be aligned with those depicted in FIGS. 14 and 19.

As depicted in FIG. 10, the battery cell 51 includes: a battery container 52 made of a resin to internally contain a power generating element (not depicted); and bolt-shaped electrode terminals 53A and 53B (a positive electrode is represented by the symbol 53A while a negative electrode is represented by the symbol 53B) The electrode terminals 53A and 53B project perpendicularly from an upper end surface 52A (terminal forming surface 52A) of the battery container 52. The battery cells 51 are juxtaposed such that positive sides and negative sides of adjacent battery cells 51 are opposite to each other. Accordingly, the electrode terminals 53A and 53B, which respectively have different polarities, are adjacent to each other. The electrode terminals 53A and 53B are fastened with nuts 54 while interposed by the bus bars 60 contained in the container members 70. Although not depicted in detail, the plurality of electric cells 51 is fixed by two holding plates as in the first embodiment.

As depicted in FIG. 10, the plurality of container members 70 is juxtaposed on an electric cell line 50A formed by the plurality of electric cells 51, in a direction in which the electric cells 51 are juxtaposed. With this arrangement, container member lines 71A and 71B are disposed thereon while forming belt shapes in their entirety. The container member lines 71A and 71B, which are two lines disposed in the direction in which the electric cells 51 are juxtaposed, each contain the bus bars 60 and hold a belt-shaped voltage detecting line 84 disposed in the direction in which the electric cells 51 are juxtaposed (see, FIGS. 10 and 11). In this description, the container member line 71A (i.e., the one located at the side closer to the reader in FIG. 10) will be referred to as a first container member line 71A, and the container member line 71B (i.e., the one located at the side away from the reader in FIG. 10) will be referred to as a second container member line 71B.

Figure 11:
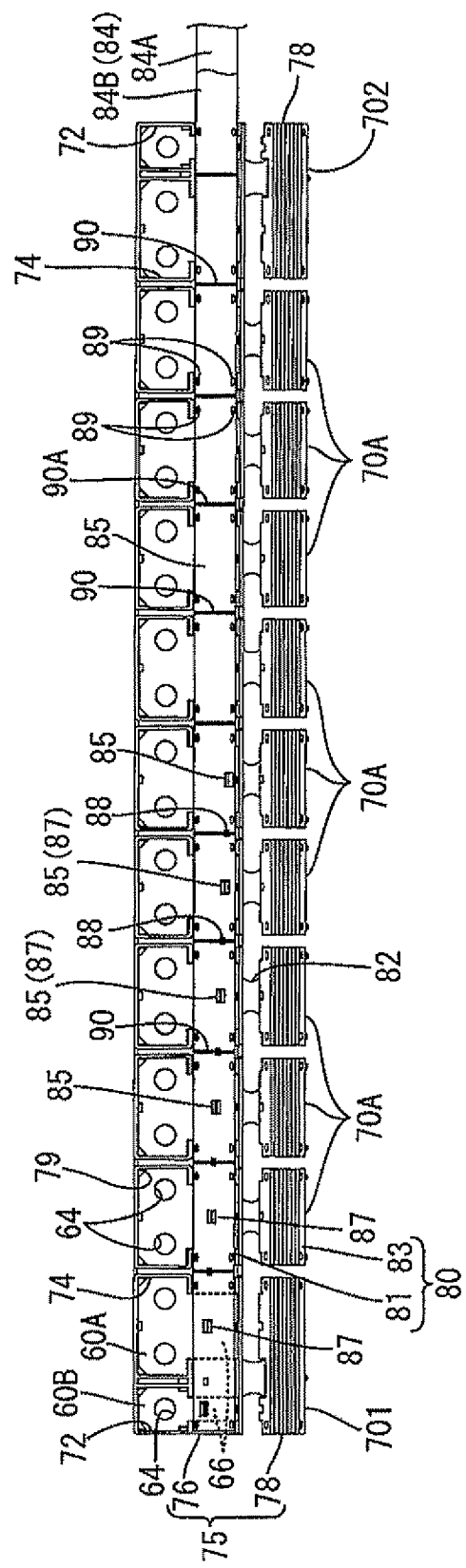
FIG. 11 is a top view depicting a first container member line.

As depicted in FIG. 11, the first container member line 71A is formed by eleven (plural) container members 70. The eleven container members 70 in the first container member line 71A are integrally jointed together by jointing joints 91 and attaching the FFC 84 to the container members 70 (see FIG. 20). The FFC 84 is connected to a battery ECU (not depicted) like the FFC 30 in the first embodiment.

Although not depicted in detail, the second container member line 71B is formed by twelve (plural) container members 70. The twelve container members 70 in the second container member line 71B are integrally jointed together by the jointing the joints 91 and the FFC 84.

Of the eleven container members 70 in the first container member line 71A, end container members 70B respectively located at right and left ends depicted in FIG. 11 are to be approximately 1.5 times as great as container members 70A located at positions other than the ends (hereinafter referred to as "first container members 70A"). The twelve container members in the second container member line 71B each have the same size and shape as the first container members 70A, and these twelve container members are also referred to as "first container members 70A." In this embodiment, the "container members 70" will be used when the first container members 70A and the end container members 70B need not to be distinguished.

The two end container members 70B, which are made of a synthetic resin, are mounted to bridge adjacent three electric cells 51. As depicted in FIG. 11, each end container member 70B includes: two bus bar containers 72 and 74 containing two types of bus bars 60A and 60B respectively; and an FFC container 75 containing the FFC 84 measuring the voltage of the electric cells 51.

Each end container member 70B is formed by integrally molding a synthetic resin. The longitudinal dimension of each end container member 70B is slightly smaller than the width dimension of the three electric cells 51. With this arrangement, when the end container member 70B is mounted on the electric cell line 50A, a small clearance is made between the end container member 70B and the first container member 70A adjacent thereto (see, FIG. 10).

In the first container member line 71A, the two end container members 70B are symmetrical to each other, as depicted in FIG. 11. Specifically, each of the end container members 70B and 70B has a first bus bar container 72 containing a single-hole bus bar 60B provided with a single terminal insertion hole 64 (detailed later) at its side closer to an end of the electric cell line 50A. On the other hand, each of the end container members 70B and 70B has a second bus bar container 74 containing a two-hole bus bar 60A provided with two terminal insertion holes 64 (detailed later) at its side closer to the center of the electric cell line 50A.

In this description, when the two end container members 70B are distinguished from each other, the end container member 70B located closer to the left end in FIG. 11 will be referred to as a "left end container member 70l", while the end container member 70B located closer to the right end in FIG. 11 will be referred to as a "right end container member 702". The "end container member(s) 70B" will collectively refer to the left end container member 701 and the right end container member 702. Arrangements common in the two end container members 701 and 702 will be denoted by the same symbol, and described altogether at one time to omit any duplicate description.

Description will be made with respect to the two types of the bus bars 60A and 60B to be contained in the end container members 70B.

The single-hole bus bars 60B and the two-hole bus bars 60A each have substantially a T shape (see, FIGS. 11 and 21). The bus bars 60 are made of a metal such as copper, copper alloy or stainless steel (SUS). Widely-shaped portions of the bus bars 60 serve as regions 65 at which the terminal insertion holes 64 are provided, i.e., terminal connecting regions 65 to be electrically connected to the electrode terminals 53A and 53B of the electric cells 51. On the other hand, regions 66 formed to be narrower than the terminal connecting regions 65 serve as detecting-line connecting regions 66 to be connected to the FFC 84. Of the corners of the terminal connecting region 65 of each bus bar 60, two corners disposed along container walls of the bus bar containers 72 and 74 located at the side away from the reader in FIG. 11 (hereinafter referred to as rear walls 72A and 74A) are substantially triangularly cut off. In this embodiment, the "bus bars 60" will collectively refer to the single-hole bus bars 60B and the two-hole bus bars 60A.

The first bus bar container 72 containing the single-hole bus bar 60B is mounted onto the electric cell 51 disposed at the end. On the other hand, the second bus bar container 74 containing the two-hole bus bar 60A is mounted to bridge two electric cells 51. As is clear from the comparison of FIG. 12 with FIG. 15, positioning of the first bus bar container 72 and the second bus bar container 74 in the left end container member 701 and that in the right end container member 702 are opposite to each other.

As depicted in FIG. 11, the first bus bar container 72 is configured to contain the terminal connecting region 65 of the single-hole bus bar 60B provided with the single terminal insertion hole 64. The first bus bar container 72 has container walls 72A, 72B, 72D and 72E standing from the terminal forming surface 52A of the electric cells 51, and the container walls 72A, 72B, 72D and 72E surround the terminal connecting region 65 of the single-hole bus bar 60B (see, FIGS. 12, 13, 15 and 16). The container wall 72B of the first bus bar container 72, which is a container wall located closer to the FFC container 75 (i.e., a container wall located closer to the reader in FIGS. 12 and 15, and hereinafter referred to as front wall 72B), is partially open.

A bottom wall of the first bus bar container 72 (i.e., a wall at which the first bus bar container is mounted on the terminal forming surface 52A of the electric cells 51) is substantially rectangularly cut off except for mounting portions 73A. The mounting portions 73A are formed to follow the laterally-provided container walls 72D and 72E (lateral walls 72D and 72E) and configured to be mounted with the ends of the terminal connecting region 65 of the single-hole bus bar 60B.

The lateral walls 72D and 72E of the first bus bar container 72 are respectively provided with slits 73B extending upward from the lower ends of the lateral walls 72D and 72E. In each of the lateral walls 72D and 72E, the slits 73B are positioned at an end closer to an opening 72C and at a position adjacent to the mounting portion 73A. Between the two slits 73B and 73B, a locking claw 73C mounted on an upper surface of the single-hole bus bar 60B and to lock the single-hole bus bar 60B is provided (see, FIGS. 13 and 14).

Figure 12:
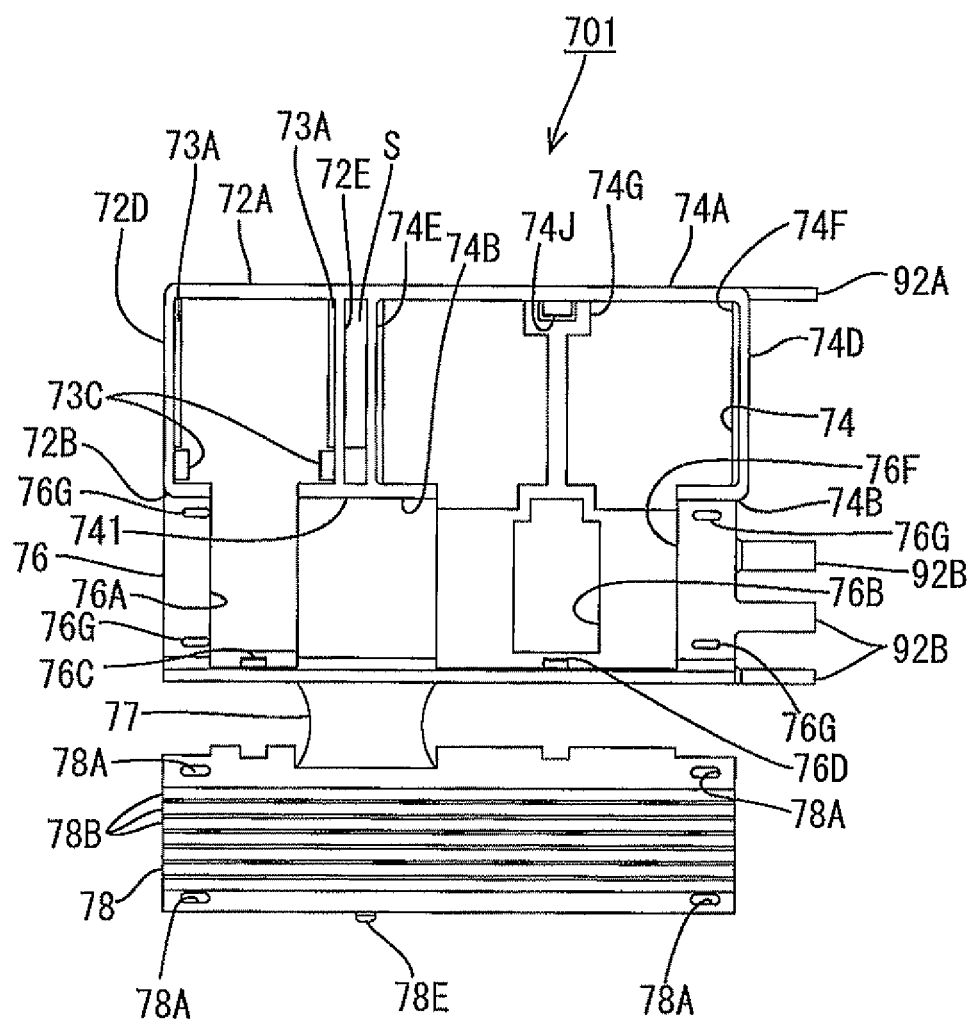
FIG. 12 is a top view depicting a left end container member.
Figure 15:
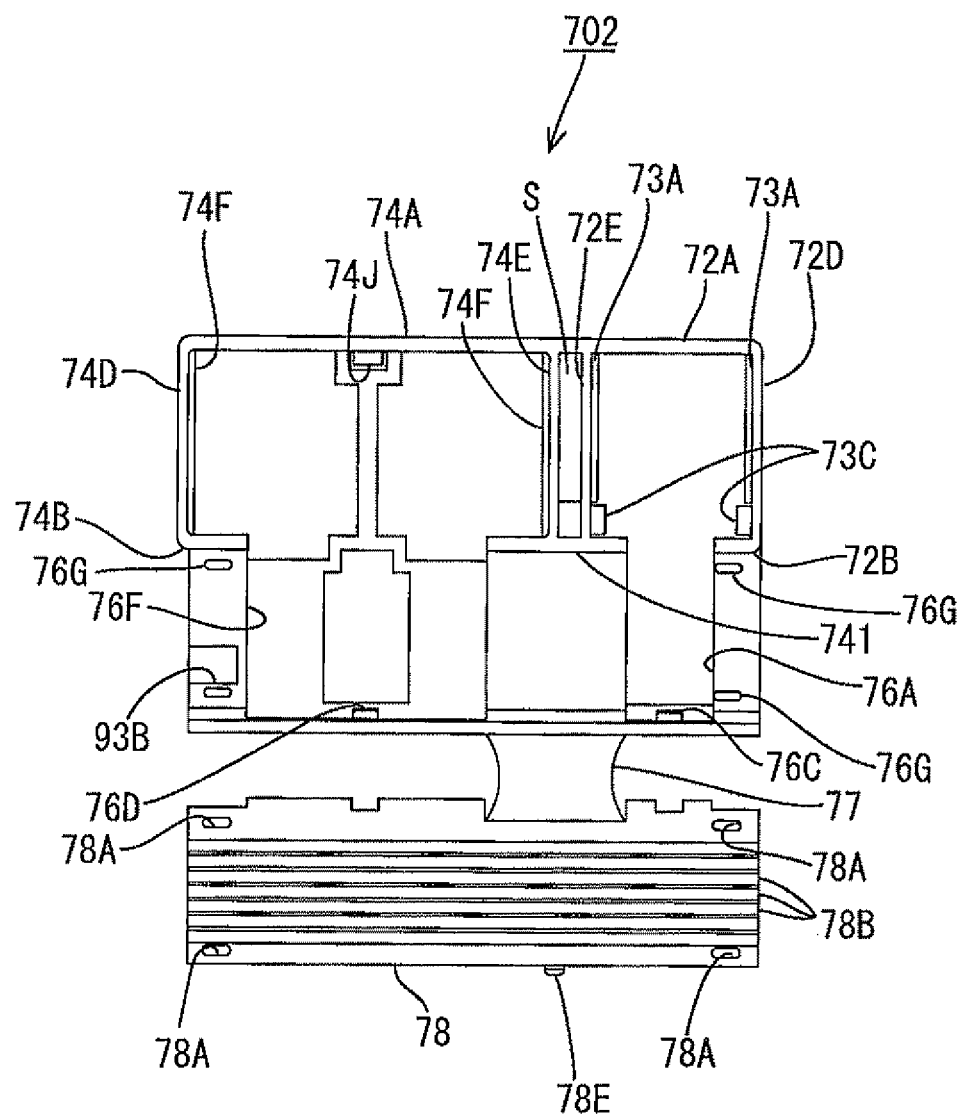
FIG. 15 is a top view depicting a right end container member.

As depicted in FIGS. 12 and 15, an escape space S allowing the locking claw 73C provided to the lateral wall 72E to escape is secured between the lateral wall 72E (i.e., the wall closer to the second bus bar container 74, of the two lateral walls 72D and 72E of the first bus bar container 72) and a lateral wall 74E (detailed later) of the second bus bar container 74.

Figure 13:
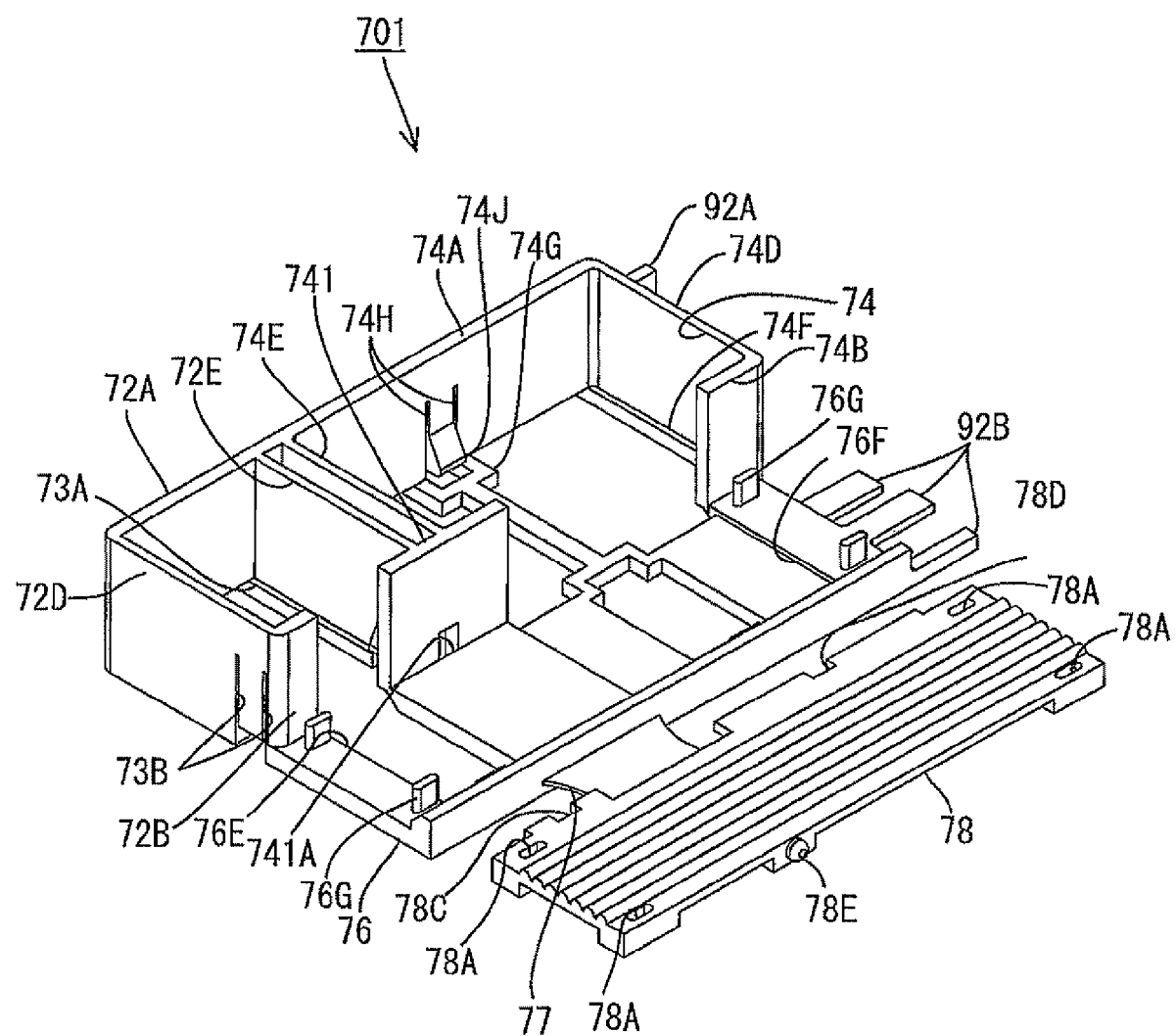
FIG. 13 is a perspective view depicting the end container member depicted in FIG. 12.
Figure 14:
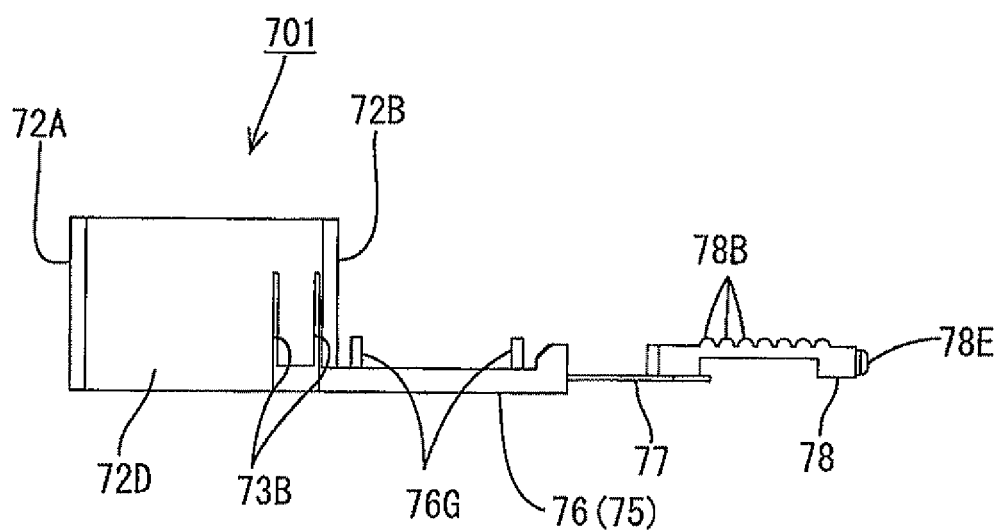
FIG. 14 is a lateral view depicting the end container member depicted in FIG. 12.
Figure 16:
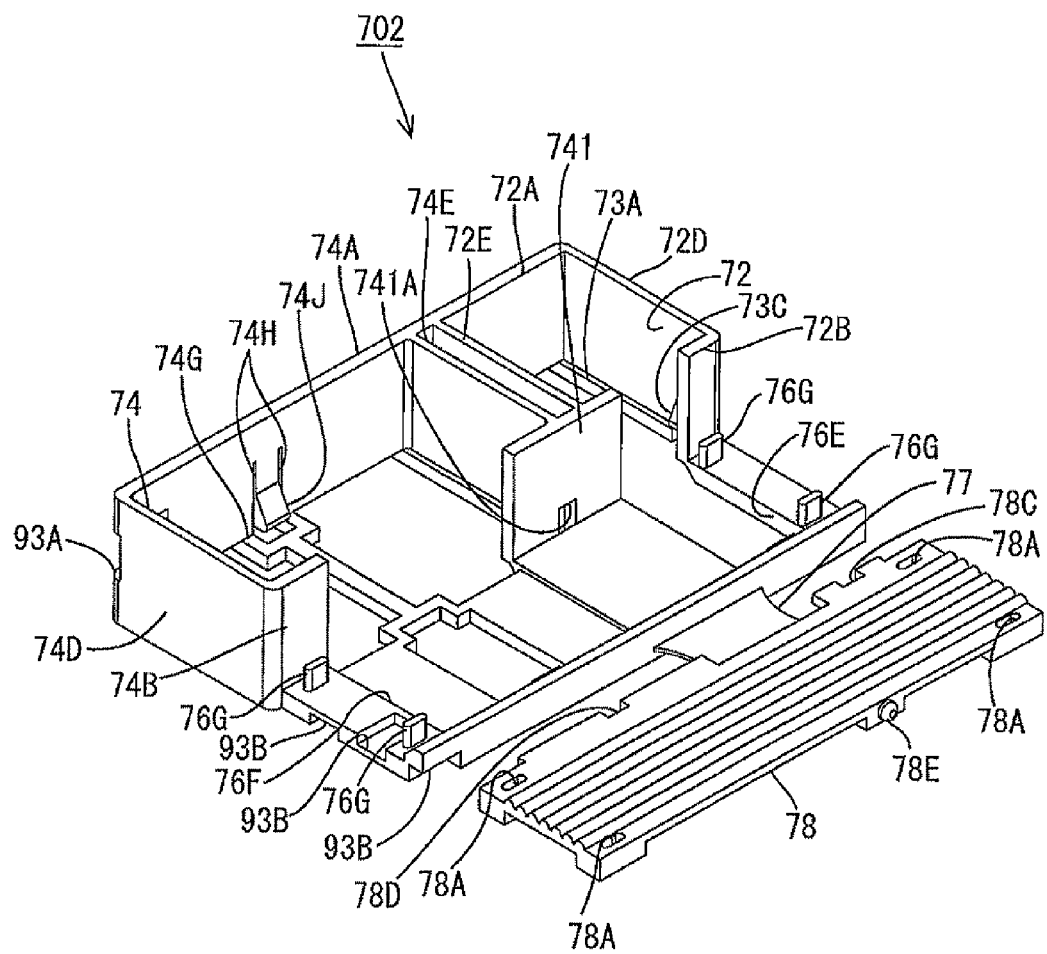
FIG. 16 is a perspective view depicting the end container member depicted in FIG. 15.

The second bus bar container 74 is configured to contain the terminal connecting region 65 of the two-hole bus bar 60A provided with the two terminal insertion holes 64. The second bus bar container 74 has container walls 74A, 74B, 74D and 74E standing from the terminal forming surface 52A of the electric cells 51, and the container walls 74A, 74B, 74D and 74E surround the terminal connecting region 65 of the two-hole bus bar 60A (see, FIGS. 12, 13, 15 and 16). The container wall 74B of the second bus bar container 74, which is a container wall located closer to the FFC container 75 (i.e., a container wall 74B located closer to the reader in FIGS. 12 and 15, and hereinafter referred to as front wall 74B), is partially open, and separated into two portions. Of the two front walls 74B and 74B of the second bus bar container 74, the front wall 74B closer to the first bus bar container 72 is continuously integrated with the front wall 72B of the first bus bar container 72 (hereinafter referred to as integrated wall 741). As depicted in FIGS. 13 and 16, substantially a central portion of the integrated wall 741 is provided with a first locking hole 741A locking a third locking projection 78E (detailed later) of an FFC holder 78.

A bottom wall of the second bus bar container 74 (i.e., a wall at which the second bus bar container 74 is mounted on the terminal forming surface 52A of the electric cells 51) is cut off except for end mounting portions 74F and a center mounting portion 74G. The end mounting portions 74F are formed to follow the laterally-provided container walls 74D and 74E (lateral walls 74D and 74E) and configured to be mounted with the ends of the terminal connecting region 65 of the two-hole bus bar 60A, while the center mounting portion 74G is configured to be mounted with a substantially central portion of the terminal connecting region 65 of the two-hole bus bar 60A. Of the lateral walls 74D and 74E of the second bus bar container 74, the lateral wall closer to the first bus bar container 72 will be referred to as the lateral wall 74E.

A substantially central portion of the rear wall 74A of the second bus bar container 74 is provided with two slits 74H and 74H extending upward from the lower end of the rear wall 74A. Between the two slits 74H and 74H, a locking claw 74J mounted on an upper surface of the two-hole bus bar 60A to lock the two-hole bus bar 60A is provided. In the second bus bar container 74, the locking claw 74J is positioned at a position corresponding to the center mounting portion 74G.

The rear wall 74A of the second bus bar container 74 is continuously integrated with the rear wall 72A of the first bus bar container 72. In the second bus bar container 74, the rear wall 74A is differently structured, depending on whether the rear wall 74A is for the left container member 701 or for the right container member 702.

As depicted in FIGS. 12 and 13, in the left end container member 701, the rear wall 74A of the second bus bar container 74 is provided with a first jointing projection 92A projecting outward from an outer wall surface of the rear wall 74A of the second bus bar container 74 and inserted into a third jointing receiver 93C (described later) provided to the first container member 70A adjacent thereto.

On the other hand, as depicted in FIG. 16, in the right end container member 702, the rear wall 74A of the second bus bar container 74 is partially rectangularly cut off to provide a first jointing receiver 93A. The first jointing receiver 93A is configured to receive a third joining projection 92C (described later) provided to the first container member 70A adjacent thereto.

In the next description, the FFC container 75 of the end container member 70B will be described. The FFC container 75 (an example of the "holder" according to the present invention) includes: a substantially rectangular FFC mounting portion 76 onto which the detecting-line connecting region 66 of each bus bar 60 and the FFC 84 are mounted; a substantially rectangular FFC holder 78 disposed to cover the FFC 84 mounted on the FFC mounting portion 76 and holding the FFC 84 by sandwiching the FFC 84 with the FFC mounting portion 76; and a hinge 77 jointing the FFC mounting portion 76 and the FFC holder 78 together. The FFC mounting portion 76 and the FFC holder 78 are formed substantially in parallel to each other.

The FFC mounting portion 76 is provided with: a first cut-off portion 76A continued from the cut-off portion of the bottom wall of the first bus bar container 72 and being cut off to define a T-shape as a whole; and a second cut-off portion 76B being cut off in a T-shape and provided at a substantially central portion of a region along the second bus bar container 74.

An edge of the FFC mounting portion 76 which is along the first cut-off portion 76A is provided with a first locking projection 76C locking the detecting-line connecting region 66 of the single-hole bus bar 60B. On the other hand, an edge of the FFC mounting portion 76 which is along the second cut-off portion 76B is provided with a second locking projection 76D locking the detecting-line connecting region 66 of the two-hole bus bar 60A. Further, the FFC mounting portion 76 is provided with two types of bus bar mounting portions 76E and 76F recessed from the other portions to be fittably engaged with the two-hole bus bar 60A and the single-hole bus bar 60B. In the FFC mounting portion 76, the bus bar mounting portion 76E to be fittably engaged with the single-hole bus bar 60B will be referred to as the first bus bar mounting portion 76E, while the bus bar mounting portion 76F to be fittably engaged with the two-hole bus bar 60A will be referred to as the second bus bar mounting portion 76F.

Each longitudinal end of the FFC mounting portion 76 is provided with two FFC fixing projections 76G projecting from the FFC mounting portion 76 and fixing the FFC 84. In the FFC mounting portion 76, four FFC fixing projections 76G are provided in total.

In the next description, a difference between the structure of the end portion of the FFC mounting portion 76 in the left end container member 70l and that in the right end container member 702 will be described.

As depicted in FIGS. 12 and 13, in the left end container member 70l, an end of the FFC mounting portion 76 (right end in the depiction) is provided with three second jointing projections 92B projecting from the end of the FFC mounting portion 76 to extend outward. The three second jointing projections 92B are configured to be inserted into fourth jointing receivers 93D (described later) provided to an FFC mounting portion 81 of the first container member 70A adjacent thereto.

As depicted in FIGS. 15 and 16, in the right end container member 70z, an end of the FFC mounting portion 76 (left end in the depiction) is provided with three second jointing receivers 93B recessed from the end of the FFC mounting portion 76. The three second jointing receivers 93B are configured to receive fourth jointing projections 92D (described later) provided to the FFC mounting portion 81 of the first container member 70A adjacent thereto.

A surface of the FFC holder 78 to be in contact with the FFC 84 (i.e., the upper surface in FIGS. 13 and 16) is provided with four FFC fixing holes 78A at its corners and also with a plurality of ribs 78B extending in the longitudinal direction of the FFC holder 78. The four FFC fixing holes 78A are configured to be fittably engaged respectively with the four FFC fixing projections 76G provided to the FFC mounting portion 76. The ribs 78B serve to hold the FFC 84. An edge of the FFC holder 78 closer to the hinge 77 is provided with a first escape recess 78C and a second escape recess 78D respectively allowing the first locking projection 76C and the second locking projection 76D provided to the FFC mounting portion 76 to escape when the FFC holder 78 is superposed onto the FFC mounting portion 76.

An edge of the FFC holder 78 opposite to the hinge 77 (i.e., the edge located closer to the reader in FIGS. 12 and 15) is provided with the third locking projection 78E to be locked to the first locking hole 74l A provided to the integrated wall 74l when the FFC holder 78 is superposed onto the FFC mounting portion 76.

In the next description, the first container member 70A will be described. The first container member 70A, which is made of a synthetic resin, is mounted to bridge two electric cells 51 adjacent to each other. As depicted in FIG. 11, the first container member 70A includes: a bus bar container 79; and an FFC container 80 containing the FFC 84 for measuring the voltage of the electric cells 51. The bus bar container 79 and the FFC container 80 are formed by integrally molding a synthetic resin.

The longitudinal dimension of the first container member 70A is slightly smaller than the width dimension of the two electric cells 51. With this arrangement, a slight clearance is secured between the first container members 70A adjacent to each other.

As depicted in FIG. 11, the first container member 70A contains the two-hole bus bar 60A provided with the two terminal insertion holes 64. The two-hole bus bar 6OA to be contained in the first container member 70A is structured similarly to the two-hole bus bar 60A to be contained in the end container member 70B, and thus a detailed description thereof is omitted.

As depicted in FIG. 10, the bus bar container 79 of the first container member 70A is disposed to bridge two electric cells 51. The bus bar container 79 has container walls 79A, 79B, 79D and 79E standing from the terminal forming surface 52A of the electric cells 51, and the container walls 79A, 79B, 79D and 79E surround the terminal connecting region 65 of the two-hole bus bar 60A (see, FIGS. 11 and 17). The container wall 79B of the bus bar container 79, which is a container wall located closer to the FFC container 80 (i.e., a container wall located closer to the reader in FIG. 17, and hereinafter referred to as front wall 79B), is partially open.

A bottom wall of the bus bar container 79 of the first container member 70A (i.e., a wall at which the bus bar container 79 is mounted on the terminal forming surface 52A of the electric cells 51) is cut off except for end mounting portions 79F and a center mounting portion 79G. The end mounting portions 79F are formed to follow the laterally-provided container walls 79D and 79E (lateral walls 79D and 79E) and configured to be mounted with the ends of the terminal connecting region 65 of the two-hole bus bar 60A, while the center mounting portion 79G is mounted with a substantially central portion of the terminal connecting region 65 of the two-hole bus bar 60A.

As depicted in FIG. 16, a substantially central portion of the rear wall 79A of the bus bar container 79 of the first container member 70A is provided with two slits 79H and 79H extending upward from the lower end of the rear wall 79A. Between the two slits 79H and 79H, a locking claw 79J mounted on an upper surface of the two-hole bus bar 60A and locking the two-hole bus bar 60A is provided. In the bus bar container 79, the locking claw 79J is positioned at a position corresponding to the center mounting portion 79G.

Figure 18:
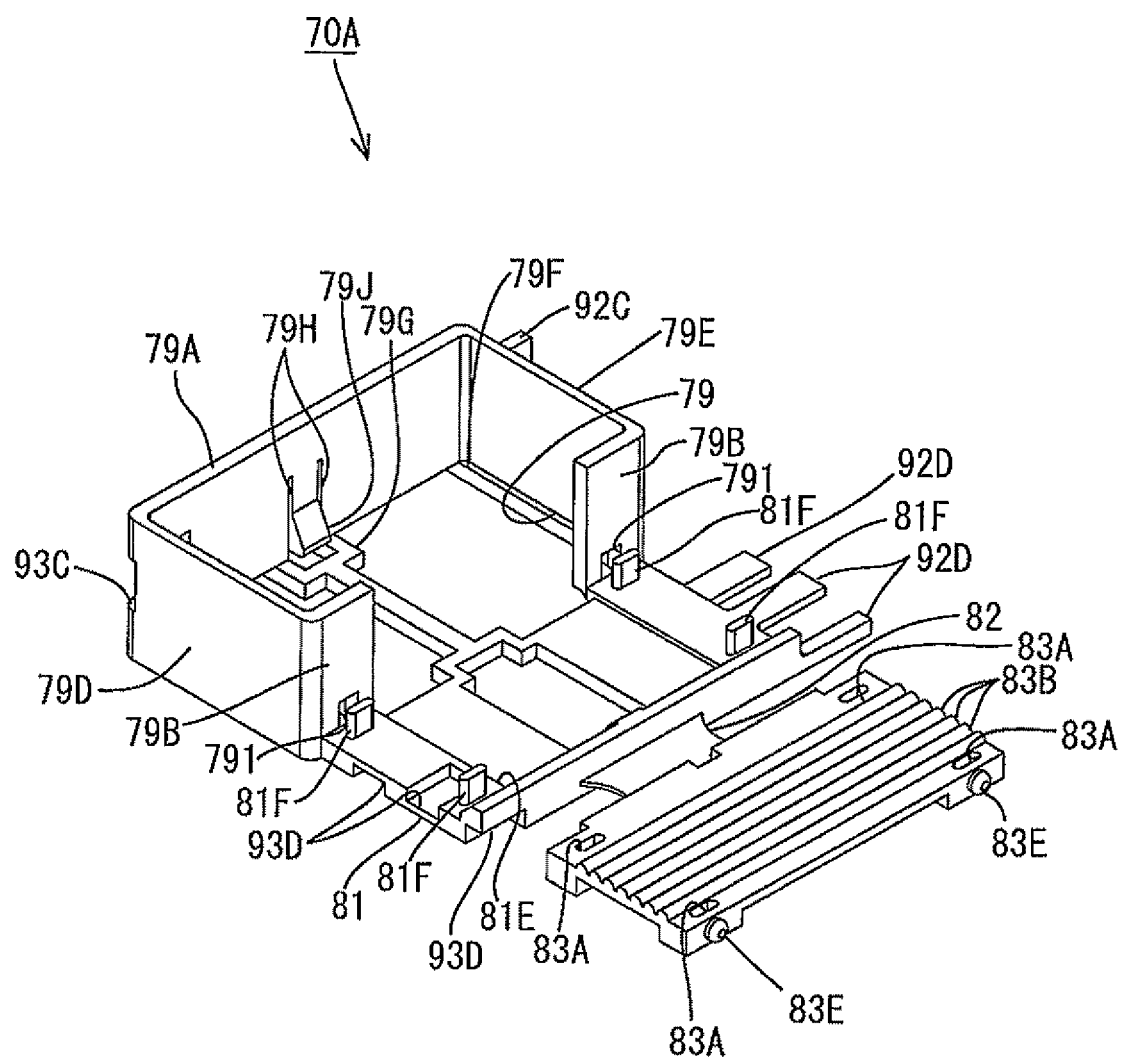
FIG. 18 is a perspective view depicting the first container member depicted in FIG. 17.
Figure 19:
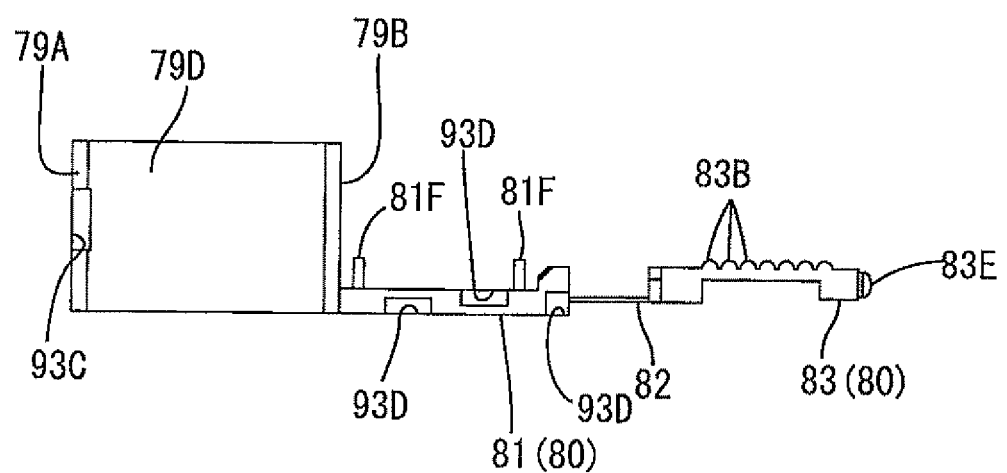
FIG. 19 is a. lateral view depicting the first container member depicted in FIG. 17.

As depicted in FIG. 18, the two front walls 79B and 79B of the bus bar container 79 of the first container member 70A are provided respectively with second locking holes 791 and 791 locking fifth locking projections 83E (detailed later) of an FFC holder 83.

Figure 17:
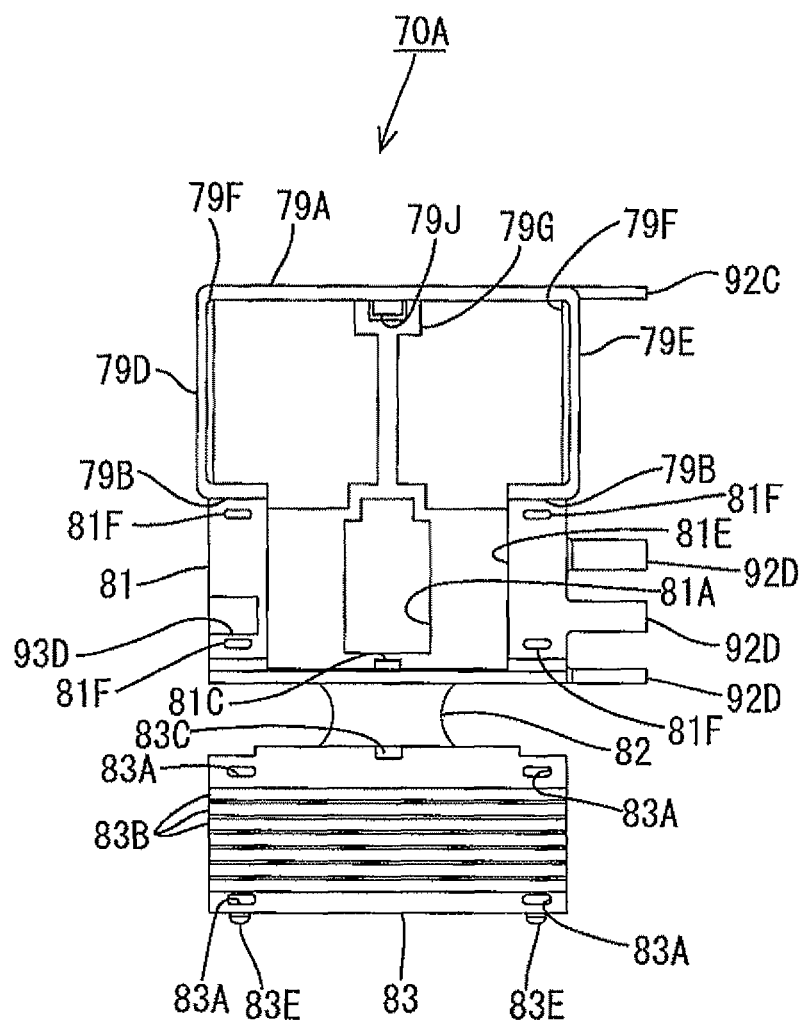
FIG. 17 is a top view depicting a first container member.

As depicted in FIGS. 17 and 18, an outer wall surface of the rear wall 79A of the bus bar container 79 of the first container member 70A is provided with the third jointing projection 92C projecting outward from the depicted right end of the rear wall 79A and to be inserted into a jointing receiver 93 of the container member 70 adjacent thereto (specifically, the third jointing receiver 93C of the first container member 70A or the first jointing receiver 93A of the right end container member 702).

In addition, the rear wall 79A of the bus bar container 79 of the first container member 70A is partially rectangularly cut off from the depicted left end to provide a third jointing receiver 93C. The third jointing receiver 93C is configured to receive a jointing projection 92 of the container member 70 adjacent thereto (specifically, the third jointing projection 92C of the first container member 70A or the first jointing projection 92A of the left end container member 701).

The FFC container 80 of the first container member 70A (an example of the "holder" according to the present invention) includes: an substantially rectangular FFC mounting portion 81 mounted with the detecting-line connecting region 66 of the two-hole bus bar 60A and the FFC 84; the substantially rectangular FFC holder 83 disposed to cover the FFC 84 mounted on the FFC mounting portion 81 and holding the FFC 84 by sandwiching the FFC 84 with the FFC mounting portion 81; and a hinge 82 jointing the FFC mounting portion 81 and the FFC holder 83 together. The FFC mounting portion 81 and the FFC holder 83 are formed substantially in parallel to each other.

The FFC mounting portion 81 of the first container member 70A is provided with a third cut-off portion 81A formed by cutting off a substantially central portion of a region along the bus bar container 79 in a T-shape.

An edge of the FFC mounting portion 81 of the first container member 70A which is along the third cut-off portion 81A is provided with a fourth locking projection 81C locking the detecting-line connecting region 66 of the two-hole bus bar 60A. Further, the FFC mounting portion 81 is provided with a third bus bar mounting portion 81E recessed from the other portions to be fittably engaged with the two-hole bus bar 60A.

Similarly to the end container member 70B, each longitudinal end of the FFC mounting portion 81 of the first container member 70A is also provided with two FFC fixing projections 81F projecting from the FFC mounting portion 81 and fixing the FFC 84. In the FFC mounting portion 81, four FFC fixing projections 81F are provided in total.

As depicted in FIGS. 17 and 18, in the FFC mounting portion 81 of the first container member 70A, an end of the FFC mounting portion 81 (right end in the depiction) is provided with three fourth jointing projections 92D projecting from the end of the FFC mounting portion 81 to extend outward. The three fourth jointing projections 92D are configured to be inserted into the jointing receivers 93 provided to the container member 70 adjacent thereto (specifically, the fourth jointing receivers 93D of the first container member 70A or the second jointing receivers 93B of the right end container member 702).

As depicted in FIGS. 17 and 18, in the FFC mounting portion 81 of the first container member 70A, an end of the FFC mounting portion 81 (left end in the depiction) is provided with three fourth jointing receivers 93D recessed from the end of the FFC mounting portion 81. The three fourth jointing receivers 93D receive the jointing projections 92 provided to the container member 70 adjacent thereto (specifically, the fourth jointing projections 92D of the first container member 70A or the second jointing projections 92B of the left end container member 701).

A surface of the FFC holder 83 of the first container member 70A to be in contact with the FFC 84 (i.e., the upper surface in FIG. 18) is provided with four FFC fixing holes 83A at its corners and also with a plurality of ribs 83B extending in the longitudinal direction of the FFC holder 83. The four FFC fixing holes 83A are configured to be fittably engaged respectively with the four FFC fixing projections 81F provided to the FFC mounting portion 81. The ribs 83B serve to hold the FFC 84. The FFC holder 83 is also provided with an escape recess 83C allowing a third locking projection 81C provided to the FFC mounting portion 81 to escape when the FFC holder 83 is superposed onto the FFC mounting portion 81.

An edge of the FFC holder 83 opposite to the hinge 82 (i.e., the edge located closer to the reader in FIGS. 17 and 18) is provided with two fifth locking projection 83E to be locked to the second locking hole 791 and 791 provided to the integrated wall 741 when the FFC holder 83 is superposed onto the FFC mounting portion 81.

As depicted in FIG. 10, the FFC 84 to be contained in the FFC holder 75 of the end container member 70B and the FFC container 80 of the first container member 70A extend in the direction in which the electric cells 51 are juxtaposed (in the right and left direction in FIG. 10). Also as depicted in FIG. 10, the FFC 84 is disposed on each of the first container member line 71A and the second container member line 71B.

An example of the FFC 84 is a conductor line laminated with an insulating resin 86 such as polyethylene terephthalate, in which a plurality of copper conductors 85 is juxtaposed such that the conductors 85 are insulated from one another. As depicted in FIGS. 11 and 21, a longitudinal edge of the FFC 84 is provided with a plurality of attaching holes 89 to be engaged with the FFC fixing projections 76G and 81F of the FFC mounting portions 76 and 81.

Similarly to the FFC 30 according to the first embodiment, the FFC 84 has mountain folded portions 90 (folded portions 90) respectively at the portions to be disposed between the bus bars 60 and 60 adjacent to each other (in this embodiment, in the vicinity of decoupling portions 88). Except for the folded portions 90, the FFC 84 is held by the FFC containers 75 and 80.

The FFC 84 has connecting portions 86 at which the FFC 84 is connected to the bus bars 60. In this embodiment, the seven (plural) conductors 85 included in the FFC 84 are connected to the bus bars 60 such that each adjacent pair of conductors 85 is connected to each bus bar 60. The connecting portions 86 at which the FFC 84 is connected to the bus bars 60 are formed by a method such as the one exemplified in the first embodiment. While two circuits are formed when the adjacent pair of conductors 85 is connected to the bus bar 60, one of the two circuits is decoupled from the other one of the two circuits by the decoupling portion 88.

The FFC 84 used in this embodiment is configured to be provided with up to seven connecting portions 86 for connection to the bus bars 60. Accordingly, when the number of the bus bars 60 connected with the FFC 84 is eight or more, two or more FFCs 84 are used for connecting the bus bars 60 with the FFCs 84. In this embodiment, as depicted in FIG. 21, since the total number of the bus bars 60 to be contained in the first container member line 71 A is thirteen, the FFC 84 (84A) is connected to the eighth to thirteenth bus bars 60 counted from the left in FIG. 21 (i.e., the thirteenth bus bar 60 is the one located at the right end) and fixed to the FFC mounting portions 76 and 81. Then, as depicted in FIG. 11, the FFC 84B longer than the FFC 84A is connected to the first to seventh bus bars 60 counted from the left in FIG. 11 and disposed to be superposed onto the previously-mounted FFC 84A.

The mounting process of the FFC 84 to the second container member line 71B is not depicted in detail, but is similar to the mounting process of the FFC 84 to the first container member line 71A. Since the total number of the bus bars 60 to be contained in the second container member line 71B is twelve, two FFCs 84 having different lengths are used for connecting the bus bars 60 with the FFCs 84.

In the next description, a method of assembling the battery module 50 according to this embodiment will be briefly described. In this embodiment, an arrangement in which twenty four electric cells 51 are linearly connected in series will be exemplarily described.

The twenty four electric cells 51 are juxtaposed with their terminal forming surfaces 52A oriented upward, and the electric cell line 50A is obtained. Then, one left end container member 701, one right end container member 702 and twenty one first container members 70A are prepared.

The FFCs 84 to be mounted on the first container member line 71A and the second container member line 71B are also prepared. Specifically, the insulating resin 86 of the FFCs 84 is peeled with laser (not depicted) to expose two conductors 85 adjacent to each other corresponding to each bus bar 60, and one of the exposed conductors 85 is provided with the decoupling portion 88 (see, FIG. 11). The decoupling portion 88 is formed by punching a part of the targeted conductor 85 with a punch or the like. Then, the predetermined portions of the FFCs 84 are bent at folding lines 90A extending in a direction substantially perpendicular to the longitudinal direction of the FFCs 84, to form the mountain folded portions 90 (folded portions 90).

Each of the end container members 70B contains one single-hole bus bar 60B and one two-hole bus bar 60A, and each of the first container members 70A contains the two-hole bus bar 60A.

The accommodating operations are conducted by disposing the detecting-line connecting regions 66 of the single-hole bus bars 60B onto the first bus bar mounting portions 76E, and disposing the terminal connecting regions 65 of the single-hole bus bars 60B onto the first bus bar container 72. By disposing the detecting-line connecting regions 66 of the single-hole bus bars 60B onto the first bus bar mounting portions 76E, the single-hole bus bars 60B are locked by the first locking projections 76C. When the terminal connecting region 65 of the single-hole bus bar 60B is inserted into the first bus bar container 72, the ends of the single-hole bus bar 60B abut on the two locking claws 73C and 73C and thereby deflect the locking claws 73C and 73C outward. When the ends of the single-hole bus bar 60B are mounted on the mounting portions 73A provided to the lateral walls 72E and 72D of the first bus bar container 72, the two locking claws 73C and 73C have elastic recovery such that the terminal connecting region 65 of the single-hole bus bar 60B is locked while contained in the first bus bar container 72.

Similarly to the single-hole bus bars 60B, the accommodating operations are conducted with respect to the two-hole bus bars 60A. In the end container member 70B, the detecting-line connecting region 66 of the two-hole bus bar 60A is locked by the second locking projection 76D, and the terminal connecting region 65 of the two-hole bus bar 60A is locked by the locking claw 74J of the second bus bar container 74. In the first container member 70A, the detecting-line connecting region 66 of the two-hole bus bar 60A is locked by the fourth locking projection 81C, and the terminal connecting region 65 of the two-hole bus bar 60A is locked by the locking claw 79J of the bus bar container 79.

Subsequently, the first container member line 71A and the second container member line 71B are prepared.

The left end container member 701, the nine first container members 70A and the right end container member 702 are sequentially jointed together such that their terminal insertion holes 64 are aligned in one line. The first jointing projection 92A and the second jointing projections 92B of the left end container member 701 are respectively inserted into the third jointing receiver 93C and the fourth jointing receivers 93D of the first container member 70A, and the left end container member 701 is thereby connected with the first container member 70A. The third jointing projection 92C and the fourth jointing projections 92D of the first container member 70A connected to the left end container member 701 are respectively inserted into the third jointing receiver 93C and the fourth joining receivers 93D of another first container member 70A, and the two first container members 70A are thereby jointed together. By repeating the similar jointing operations, the left end container member 701 is connected with the nine first container members 70A. When the third jointing projection 92C and the fourth jointing projections 92D of the first container member 70A disposed at the right end are respectively inserted into the first jointing receiver 93A and the second jointing receivers 93B of the right end container member 702, the jointing operations are completed, and the FFC mounting portions 76 and 81 of the eleven container members 70A and 70B are linearly arranged.

When the FFCs 84 are fixed to the FFC mounting portions 76 and 81 by inserting the FFC fixing projections 76G and 81F of the linearly-arranged FFC mounting portions 76 and 81 into the attaching holes 89 of the FFC 84, the folded portions 90 of the FFC 84 are positioned between the container members 70A. At this time, first of all, the shorter FFC 84A is fixed to the FFC mounting portions 76 and 81 such that the each bus bar 60 is connected with the FFC 84. In connecting each bus bar 60 with the FFC 84, the adjacent two exposed conductors 85 are connected to the corresponding bus bar 60 by welding. In this manner, the first container member line 71A with the FFC 84A connected is obtained as depicted in FIG. 21. Subsequently, the adjacent two conductors 85 of the longer FFC 84B are welded to the corresponding bus bar 60, and the FFC 84B is connected to the bus bar 60. In this manner, the first container member line 71A depicted in FIGS. 11 and 20 is obtained.

Then, the third locking projection 78E of the FFC holder 78 and the fifth locking projections 83E and 83E of the FFC holder 83 are respectively locked by the first locking hole 741A of the integrated wall 741 of the second bus bar container 74 and the second locking holes 791 and 791 of the bus bar container 79. The FFC fixing holes 78A and 83A of the FFC holders 78 and 83 are also engaged with the FFC fixing projections 76G and 81F of the FFC mounting portions 76 and 81. With these operations, the FFCs 84 are held, and then the first container member line 71A is obtained.

Likewise, by jointing the twelve first container members 70A together such that their terminal insertion holes 64 are aligned in one line, the FFC mounting portions 81 of the twelve container members 70A are linearly arranged. By inserting the FFC fixing projections 81F of the linearly-arranged FFC mounting portions 81 into the attaching holes 89 of the FFCs 84, the FFCs 84 are fixed to the FFC mounting portions 81, and each bus bar 60 is connected with the FFCs 84 by the method similar to the one described above. Subsequently, the fifth locking projections 83E and 83E of the FFC holder 83 are respectively locked by the second locking holes 791 and 791 of the bus bar container 79, and the FFC fixing holes 83A of the FFC holder 83 are also engaged with the FFC fixing projections 81F of the FFC mounting portions 81. With these operations, the FFCs 84 are held, and the second container member line 71B is obtained.

The first container member line 71A and the second container member line 71B, which are respectively prepared in the above-described processes, are respectively mounted on the predetermined positions of the terminal forming surface 52A of the electric cell line 50A. By inserting the electrode terminals 53A and 53B of the electric cells 51 into the terminal insertion holes 64 of the bus bars 60 contained in the container members 70A and 70B, and screwing and fastening the electrode terminals 53A and 53B with the nuts 54, the electrode terminals 53A and 53B are connected to the bus bars 60. With the completion of the connecting operations, the battery module 50 according to this embodiment is obtained.

According to this embodiment, the following advantageous effects are obtained.

Like the battery module according to the first embodiment, the battery module 50 according to this embodiment includes the FFC 84 as the component for jointing together the plurality of bus bars 60 electrically connecting the electrode terminals 53A and 53B, and the portions of the FFC 84 to be disposed between the adjacent bus bars 60 and 60 are provided with the folded portions 90 formed by folding the FFC 84 at the folding lines extending in the direction crossing the longitudinal direction of the FFC 84. Thus, according to this embodiment as well, even when pitches between the adjacent electrode terminals 53A and 53B of the electric cells 51 of the battery module 50 are not constant, or even when the pitches between the electrode terminals 53A and 53B are made non-constant due to the shrinkage or expansion of the electric cells 51 of the battery module 50 in the direction in which the electric cells 51 are juxtaposed, such non-constancy of the pitches between the electrode terminals 53A and 53B is compensated by the folded portions 90 provided to the FFC 84. Resultantly, also in the battery module 50 according to this embodiment, non-constancy of the pitches between the adjacent electrode terminals 53A and 53B is easily adjustable.

Further, like the first embodiment, according to this embodiment as well, the FFC 84 serves as the voltage detecting line. Thus, the FFC 84 not only connects the bus bars 60 but also serves as the voltage detecting line detecting the voltage of the electric cells 51. As a consequence, according to this embodiment, no other voltage detecting line than the FFC 84 is required to be separately connected to the battery module 50, and thus the number of components is reducible.

In addition, according to this embodiment, the flat-shaped FFC 84 is used as the voltage detecting line, and the conductors 85 of the FFC 84 are directly connected to the bus bars 60. Therefore, the connection structure of the voltage detecting line 84 saves space in the upper and lower direction of the electric cells 51 (the thickness direction of the terminal forming surface 52A), and the connection structure of the voltage detecting line is downsized in the battery module 50. Further, with the above structure, the FFC 84 is connectable to the bus bars 60 by a low-cost method such as resistance welding or ultrasonic welding, which also contributes to further cost reduction.

Incidentally, if the electric cells 51 are greatly contracted or expanded, one concern would be that the FFC 84 may be twisted when the folded portions 90 of the FFC 84 elongated in accordance with the expansion of the electric cells 51 return to their original positions in accordance with the contraction of the electric cells 51. According to this embodiment, however, the battery module includes the plurality of container members 70 containing the bus bars 60, and the container members 70 include the FFC containers 75 and 80 (holder) holding the portions of the FFC 84 other than the folded portions 90. Therefore, the FFC 84 is held by the FFC containers 75 and 80 of the container members 70 to prevent the FFC 84 from being prevented.

Further, according to this embodiment, each container member 70 is provided with the joint 91 jointing the container members 70 adjacent to each other, and the joint 91 includes: the jointing projections 92 projecting in the direction in which the plurality of electric cells 51 is juxtaposed (the first jointing projection 92A, the second jointing projections 92B, the third jointing projection 92C and the fourth jointing projections 92D); and the jointing receivers 93 receiving the jointing projections 92 (the first jointing receiver 93A, the second jointing receivers 93B, the third jointing receiver 93C and the fourth jointing receivers 93D). Accordingly, even when the electric cells 51 are greatly contracted or expanded, the rotation of the container members 70 holding the FFC 84 is prevented. Thus, the FFC 84 is reliably prevented from being twisted. In addition, since the adjacent container members 70 are jointed together by: the jointing projections 92 provided to the container members 70 to project in the direction in which the electric cells 51 are juxtaposed; and the jointing receivers 93 receiving the jointing projections 92, non-constancy in the pitches between the electrode terminals 53A and 53B is compensated by changing a insertion length of the jointing projections 92 inserted into the jointing receivers 93. Also in the container members 70, non-constancy in the pitches between the electrode terminals 53A and 53B is easily adjustable.

According to this embodiment, each adjacent two conductors 85 are connected to a single one of the bus bars 60, and one of the plurality of circuits formed by connecting the conductors 85 with the bus bar 60 is decoupled from the other ones of the circuits. Thus, a single circuit is formed per a single bus bar 60, which makes usable an FFC 84 in which the conductors 85 are narrowly spaced apart from one another.

<Other Embodiment>

The present invention is not limited to the embodiments described with the description above and the drawings. For example, the following embodiments are also included in the technical scope of this invention.

(1) While the FFC is provided with the mountain-folded portions at the portions to be disposed between the adjacent bus bars according to the above embodiments, the folded portions may be valley-folded portions.

(2) While the container members are provided with the holders holding the portions other than the folded portions according to the above second embodiment, the container members may be those not provided with the holders.

(3) According to the above second embodiment, the container members are provided with, as the holders holding the FFC, the FFC mounting portions and the FFC holders sandwiching the FFC with the FFC mounting portions, and the FFC fixing projections fixing the FFC onto the FFC mounting portion. However, the arrangement is not limited thereto. For instance, without having fixing projections fixing the FFC, the holders may be provided only with a structure holding the FFC by sandwiching the portions of the FFC other than the folded portions.

(4) While the FFC serves as the voltage detecting line according to the above embodiments, the FFC may be used only for jointing the connecting members such as the bus bars, and a voltage detecting line may be separately provided.

(5) While the container members are provided with the plurality of joints according to the above second embodiment, no joint may be provided to the container members or a single joint may be provided to the container members.

(6) While the battery module according to the above first embodiment includes: the metal-made battery container; and the separator provided with the projection at the position between the adjacent electric cells, the battery container may be made of a resin. When the battery container is made of a resin, no separator is required. Further, the battery module may include: a metal-made battery container; a separator; and a short circuit preventing member having short circuit preventing ribs.

(7) The FFC may be manufactured by extrusion molding.

The invention claimed is:

1. A battery module comprising:
   electric cells each having a positive electrode terminal and a negative electrode terminal, the electric cells being aligned with each other;
   connecting members electrically connecting the electrode terminals of electric cells adjacent to each other; and
   a flexible flat cable including a flat conductor and an insulating resin that surrounds an outer circumference of the flat conductor and jointing the connecting members, the flexible flat cable including portions each of which is disposed between adjacent connecting members and is a folded portion that is folded at a folding line, the folding line extending in a direction crossing a longitudinal direction of the flexible flat cable,
   the flat conductor including conductors that are aligned with each other and are laminated with the insulating resin, and each of the conductors of the flexible flat cable including a single connecting portion that is exposed and electrically connected to a single corresponding connecting member of the connecting members, the insulating resin being peeled at the connecting portion.

2. The battery module according to claim 1, further comprising container members containing the connecting members, wherein the container members are provided with a holder holding portions of the flexible flat cable other than the folded portions.

3. The battery module according to claim 2, wherein:
   the container members are provided with a joint joining container members adjacent to each other; and
   the joint includes: a jointing projection projecting in a direction in which the electric cells are juxtaposed, and a jointing receiver receiving the jointing projection.

4. The battery module according to claim 1, wherein the flexible flat cable is a voltage detecting line configured to receive a voltage of the electric cells.

5. The battery module according to claim 4, wherein the conductors of the flexible flat cable are directly connected with the connecting members, respectively.

6. The battery module according to claim 1, wherein:
   the electric cells include metal-made battery containers; and
   a resin-made separator is provided between the electric cells adjacent to each other, the separator having a projection projecting outward from an outer wall surface of the battery containers.

7. The battery module according to claim 1, wherein:
   each of the connecting members has an elongated shape, and
   the connecting portion is located at a portion of the flexible flat cable corresponding to a substantially central portion of the single corresponding connecting member with respect to an elongated direction of the single corresponding connecting member.

8. The battery module according to claim 1, wherein:
   the single connection portion of each conductor is directly connected to the single corresponding connecting member.

* * * * *